(12) United States Patent
Venkumahanti et al.

(10) Patent No.: US 8,578,382 B2
(45) Date of Patent: Nov. 5, 2013

(54) ASSOCIATING DATA FOR EVENTS OCCURRING IN SOFTWARE THREADS WITH SYNCHRONIZED CLOCK CYCLE COUNTERS

(75) Inventors: Suresh K. Venkumahanti, Austin, TX (US); Robert Shuicheong Chan, Chula Vista, CA (US); Prasanna Kumar Balasundaram, San Diego, CA (US); Louis Achille Giannini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 12/468,114

(22) Filed: May 19, 2009

(65) Prior Publication Data

US 2010/0299668 A1    Nov. 25, 2010

(51) Int. Cl.
    *G06F 9/46*        (2006.01)
(52) U.S. Cl.
    USPC ............ 718/102; 718/104; 718/107; 717/124
(58) Field of Classification Search
    USPC .................. 718/102, 104, 105, 107; 717/124
    See application file for complete search history.

(56) References Cited

U.S. PATENT DOCUMENTS

| | | | |
|---|---|---|---|
| 5,047,919 A | | 9/1991 | Sterling et al. |
| 5,845,060 A | * | 12/1998 | Vrba et al. ...................... 714/12 |
| 6,047,390 A | | 4/2000 | Butt et al. |
| 6,052,708 A | * | 4/2000 | Flynn et al. ................... 718/108 |
| 6,314,530 B1 | | 11/2001 | Mann |
| 6,330,008 B1 | | 12/2001 | Razdow et al. |
| 6,360,337 B1 | | 3/2002 | Zak et al. |
| 6,378,125 B1 | | 4/2002 | Bates et al. |
| 6,496,848 B1 | * | 12/2002 | Nankaku ........................ 718/100 |
| 6,658,654 B1 | | 12/2003 | Berry et al. |
| 7,020,871 B2 | | 3/2006 | Bernstein et al. |
| 7,194,385 B2 | | 3/2007 | Flautner et al. |
| 7,360,203 B2 | | 4/2008 | Ober et al. |
| 7,370,243 B1 | | 5/2008 | Grohoski et al. |
| 7,453,910 B1 | * | 11/2008 | Biberstein et al. ............ 370/503 |
| 7,702,937 B2 | * | 4/2010 | Oh et al. ....................... 713/322 |
| 7,813,897 B2 | * | 10/2010 | Lee et al. ...................... 702/186 |
| 2002/0156825 A1 | | 10/2002 | Hoover, Jr. et al. |
| 2003/0005399 A1 | | 1/2003 | Igarashi et al. |

(Continued)

OTHER PUBLICATIONS

Kalantari et al., Tightly synchronized distributed measurement and event triggers, May 12-15, 2008, IEEE, pp. 1-5.*

(Continued)

*Primary Examiner* — Abdullah Al Kawsar
*Assistant Examiner* — Abu Z Ghaffari
(74) *Attorney, Agent, or Firm* — Peter Michael Kamarchik; Nicholas J. Pauley; Joseph Agusta

(57) ABSTRACT

Methods, apparatuses, and computer-readable storage media are disclosed for reducing power by reducing hardware-thread toggling in a multi-processor. In a particular embodiment, a method is disclosed that includes collecting data from a plurality of software threads being processed by a processor, where the data for each of the events includes a value of an associated clock cycle counter upon occurrence of the event. Data is correlated for the events occurring for each of the plurality of threads by starting each of a plurality of clock cycle counters associated with the software threads at a common time. Alternatively, data is correlated for the events by logging a synchronizing event within each of the plurality of software threads.

31 Claims, 16 Drawing Sheets

(56) References Cited

U.S. PATENT DOCUMENTS

| | | |
|---|---|---|
| 2003/0200250 A1* | 10/2003 | Kiick .......................... 709/102 |
| 2004/0117768 A1 | 6/2004 | Chang et al. |
| 2005/0081206 A1* | 4/2005 | Armstrong et al. ........... 718/100 |
| 2005/0138666 A1* | 6/2005 | Narusawa et al. .............. 725/89 |
| 2006/0242645 A1 | 10/2006 | Codrescu et al. |
| 2007/0168768 A1 | 7/2007 | Galbi et al. |
| 2007/0168968 A1 | 7/2007 | Bates et al. |
| 2007/0266387 A1* | 11/2007 | Henmi ......................... 718/102 |
| 2008/0155348 A1* | 6/2008 | Ivanov et al. .................. 714/45 |
| 2009/0006672 A1* | 1/2009 | Blumrich et al. ............... 710/54 |
| 2009/0006894 A1* | 1/2009 | Bellofatto et al. .............. 714/34 |
| 2010/0287561 A1* | 11/2010 | Floyd et al. ................... 718/108 |

OTHER PUBLICATIONS

Marouani et al., Comparing high resoultion timestamps in computer clusters, May 2005, IEEE, pp. 400-403.*

International Search Report and Written Opinion—PCT/US2010/035406, International Search Authority—European Patent Office—Dec. 22, 2010.

Taiwan Search Report—TW099115962—TIPO—Jul. 12, 2013.

* cited by examiner

| Clock Cycles 501 | T1 Event 503 | T1 Cycle Counter 512 — T1 Packet 505 | T2 Event 507 | T2 Cycle Counter 552 — T2 Packet 509 | 500B Core Reset 504 |
|---|---|---|---|---|---|
| 0 511 | T1 Start (T1-P0 Commit) 514 | 510 — T1 Start (Cycle 0000) 516 520 | | | |
| 1000 513 | T1-P1 Commit 518 | 522 — T1-P1 (Cycle 1000) 520 | | | |
| 2000 515 | | | | | |
| 3000 517 | T1-P2 Commit 526 | 530 — T1-P2 (Cycle 3000) 528 | | | |
| 4000 519 | | 570 — Async 0 (Cycle (T2-P0) 4000) 574 572 | T2 Start (T2-P0 Commit) 534 | 535 — T2 Start (Cycle 4000) 536 | |
| 5000 521 | | 580 — Async 1 (Cycle (T3-P0) 5000) 584 582 | | 590 — Async 1 (Cycle (T3 P0) 1000) 594 592 | |
| 6000 523 | | | T2-P1 Commit 564 | 560 — T2-P1 (Cycle 2000) 566 | |

*FIG. 5B*

|  |  | 512 ⌐ T1 Cycle Counter |  | 552 ⌐ T2 Cycle Counter |  | 500C ⌐ |
|---|---|---|---|---|---|---|
| Clock Cycles 501 | T1 Event 503 | T1 Packet 505 | T2 Event 507 | T2 Packet 509 |  | 504 ⌐ Core Reset |
| 0 511 | T1 Start (T1-P0 Commit) 514 | ⌐510 T1 Start (Cycle 0000) 516 |  |  |  |  |
| 1000 513 | T1-P1 Commit 518 | ⌐522 T1-P1 (Cycle 1000) 520 |  |  |  |  |
| 2000 515 |  |  |  |  |  |  |
| 3000 517 | T1-P1 Commit 526 | ⌐530 T1-P2 (Cycle 3000) 528 |  |  |  |  |
| 4000 519 |  | ⌐570 Async 0 (Cycle (T2-P0) 4000) 574 572 | T2 Start (T2-P0 Commit) 534 | ⌐534 T2 Start (Cycle 0000) 536 |  |  |
| 5000 521 |  | ⌐580 Async 1 (Cycle (T3-P0) 1000) 584 583 |  | ⌐590 Async 1 (Cycle (T3-P0) 1000) 594 593 |  |  |
| 6000 523 |  |  | T2-P1 Commit 564 | ⌐560 T2-P1 (Cycle 1000) 567 |  |  |

FIG. 5C

ASSOCIATING DATA FOR EVENTS OCCURRING IN SOFTWARE THREADS WITH SYNCHRONIZED CLOCK CYCLE COUNTERS

I. FIELD

The present disclosure is generally related to a system and method of associated data for events occurring in software threads with synchronized clock counters.

II. DESCRIPTION OF RELATED ART

In a multiple core processor or a multi-threaded processor, execution of one thread may affect the execution of one or more other threads. As a result, when debugging software, it may become useful to be able to debug not only a thread where a problem was exhibited, but other threads that were executing at or about the same time because of the possibility that one or more of the other threads actually caused or contributed to the problem.

A multiple core processor or a multi-threaded processor may employ clock cycle counters to count, for example, execution cycles and non-execution cycles of each of the cores or of each of the software threads. To facilitate tracing and debugging potential software problems, packets are generated, for example, when a thread transitions from an execution cycle to a non-execution cycle, when a branch is taken, etc. In addition, when a clock cycle counter that counts execution cycles or non-execution cycles reaches its capacity, packets are generated to report that a respective clock cycle counter has reached its maximum count capacity. The packets may be written to a buffer from which they are output from the processor device to facilitate debugging.

When multiple threads attempt to write out status packets indicating, for example, that their counters have reached capacity at a same time, the buffer may overflow, and the packets may be lost before the buffer is able to communicate its stored packets from the processor device. If packets are lost, it may impair the ability to debug the thread or threads for which the packets have been lost, or may reduce the usefulness of the remaining packets in debugging the thread or threads of interest.

III. SUMMARY

Methods, apparatuses, and computer-readable media are disclosed for managing event data to facilitate debugging of software threads executing in a multi-processor environment. In a multi-processing system, each of a plurality of executing threads is associated with one or more clock cycle counters, for example, to count a number of execution cycles, counter a number of non-execution cycles, etc. When one software thread encounters a problem, the problem may have been caused by execution of one or more other software threads. To facilitate debugging software problems, the one or more clock cycle counters may be synchronized among the threads so that embedded trace macro data will reflect the synchronized counter values to enable determination of when the software threads may have executed relative to one another. Instead of or in addition to synchronizing the clock cycle counters, an occurrence of a selected synchronization event may be logged in each of the software threads so that by comparison with the occurrence of the synchronization event, one may determine the relative execution sequence of a number of software threads.

Also, in order to prevent the risk of lost data, such as clock cycle count data that is typically stored in an on-device buffer, data is written to a buffer at a threshold below the maximum clock cycle count of a clock cycle counter. When the data is not written to the buffer until the clock cycle counter reaches its maximum, there may be contention for the buffer or the buffer may overflow because the buffer cannot offload previously-stored data packets quickly enough to receive new data. By causing the data to be written to the buffer at a threshold value of the clock cycle count that is less than a maximum value of the clock cycle counter, there is a margin of time for the data to be written to the buffer before the clock cycle counter reaches its maximum. The margin of time may potentially prevent data loss. In addition, different thresholds may be set for different clock cycle counters associated with each thread or for clock cycle counters associated with different threads to further reduce the possibility of contention for the buffer or the possibility of buffer overflow.

In a particular embodiment, a method of collecting data from a plurality of software threads being processed by a processor is disclosed. Data is collected for events occurring for each of the plurality of software threads, where the data for each of the events includes a value of an associated clock cycle counter upon occurrence of the event. The data for the events occurring for each of the plurality of software threads is correlated. The data for the events may be correlated by starting each of a plurality of clock cycle counters associated with the plurality of software threads at a common time. Alternatively, the data for the events may be correlated by logging a synchronizing event within each of the plurality of software threads upon occurrence of the synchronizing event.

In another particular embodiment, an apparatus is disclosed that includes a processing system configured to execute a plurality of software threads. The apparatus also includes a plurality of clock cycle counters configured to be started at a common time. Each of the plurality of clock cycle counters is associated with one of the plurality of software threads. A first-in-first-out (FIFO) buffer is configured to collect packet data for events occurring during each of the plurality of software threads. The packet data for each of the events is associated with a value of the associated clock cycle counter. An output port outputs the packet data collected in the FIFO buffer.

In another particular embodiment, an apparatus is disclosed that includes a processing system configured to execute a plurality of software threads. The apparatus also includes a plurality of clock cycle counters, where each of the plurality of clock cycle counters is associated with one of the plurality of software threads. The apparatus also includes a FIFO buffer. The FIFO buffer is configured to collect packet data for events occurring during each of the plurality of software threads, where the packet data for each of the events is associated with a value of the associated clock cycle counter. The FIFO buffer is also configured to log an occurrence of a synchronizing event within each of the plurality of software threads. The apparatus also includes an output port for outputting the packet data collected in the buffer.

In still another particular embodiment, a computer-readable storage medium is disclosed that stores instructions executable by a computer system. According to the instructions stored on the computer-readable storage medium, each of a plurality of clock cycle counters associated with each of a plurality of software threads is started. Packet data is collected for events occurring for each of the plurality of software threads. The packet data for each of the events is associated with a value of the associated clock cycle counter. The packet data is correlated for each of the plurality of software threads by starting each of the plurality of clock cycle counters at a common time or by logging a synchronizing event within each of the plurality of software threads upon occurrence of the synchronizing event. The collected packet data is output for the plurality of software threads.

According to another particular embodiment, an apparatus is configured to output collected data stored in a buffer. The apparatus includes means for collecting packet data for events occurring for each of the plurality of software threads and associating the packet data with a clock cycle count for each of the threads. The apparatus also includes means for monitoring when the clock cycle counter reaches a predetermined threshold short of a maximum counter value. The apparatus further includes means for correlating the packet data for each of the plurality of software threads where the means for maintaining the clock cycle count for each of the plurality of software threads is started at a common time or the means for collecting packet data for the events occurring for each of the plurality of software threads logs an occurrence of one or more synchronizing events for each of the plurality of software threads. The apparatus also includes means for transmitting the collected packet data when the clock cycle counter reaches the predetermined threshold.

In yet another particular embodiment, a method receives design information representing at least one physical property of a semiconductor device. The semiconductor device includes a processor configured to execute a plurality of software threads. The semiconductor device includes a plurality of clock cycle counters, where each of the plurality of clock cycle counters is associated with one of the plurality of software threads. The semiconductor device includes a buffer configured to collect packet data for each of the plurality of software threads. The packet data for each of a plurality of events of each of the plurality of software threads is associated with a value of the associated clock cycle counter. The packet data for each of the plurality of software threads is correlated by starting each of the plurality of clock cycle counters at a common time or by logging a synchronizing event within each of the plurality of software threads upon occurrence of the synchronizing event. The semiconductor device also includes an output port for outputting the packet data collected in the buffer. The method further includes transforming the design information to comply with a file format and generating a data file including the transformed design information.

In another particular embodiment, a method for outputting collected data stored in a buffer collects packet data for events occurring for each of the plurality of software threads and associates the packet data with a clock cycle count. At least one of the clock cycle counts is monitored to determine when the clock cycle count reaches a predetermined threshold, wherein the predetermined threshold is less than a maximum counter value. The collected packet data is transmitted when the clock cycle count reaches the predetermined threshold.

In an additional particular embodiment, packet data is received for each of two or more software threads. The packet data for each of the two or more software threads is associated with a clock cycle counter value generated by a clock cycle counter. Timing of the packet data is reconciled for the two or more software threads by comparing the clock cycle counter value associated with each of the two or more software threads. The clock cycle counter values are reconcilable because the clock cycle counter associated with each of the two or more software threads is started at a common time or the packet data includes data for a synchronizing event logged for each of the two or more software threads.

One particular advantage of disclosed embodiments is the ability to reconcile the execution of different software threads to facilitate debugging, as previously described. As also previously described, another particular advantage is reducing the risk of lost event data or lost packet data by causing the data to be written to a buffer at a threshold short of a maximum clock cycle count value.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 4A:
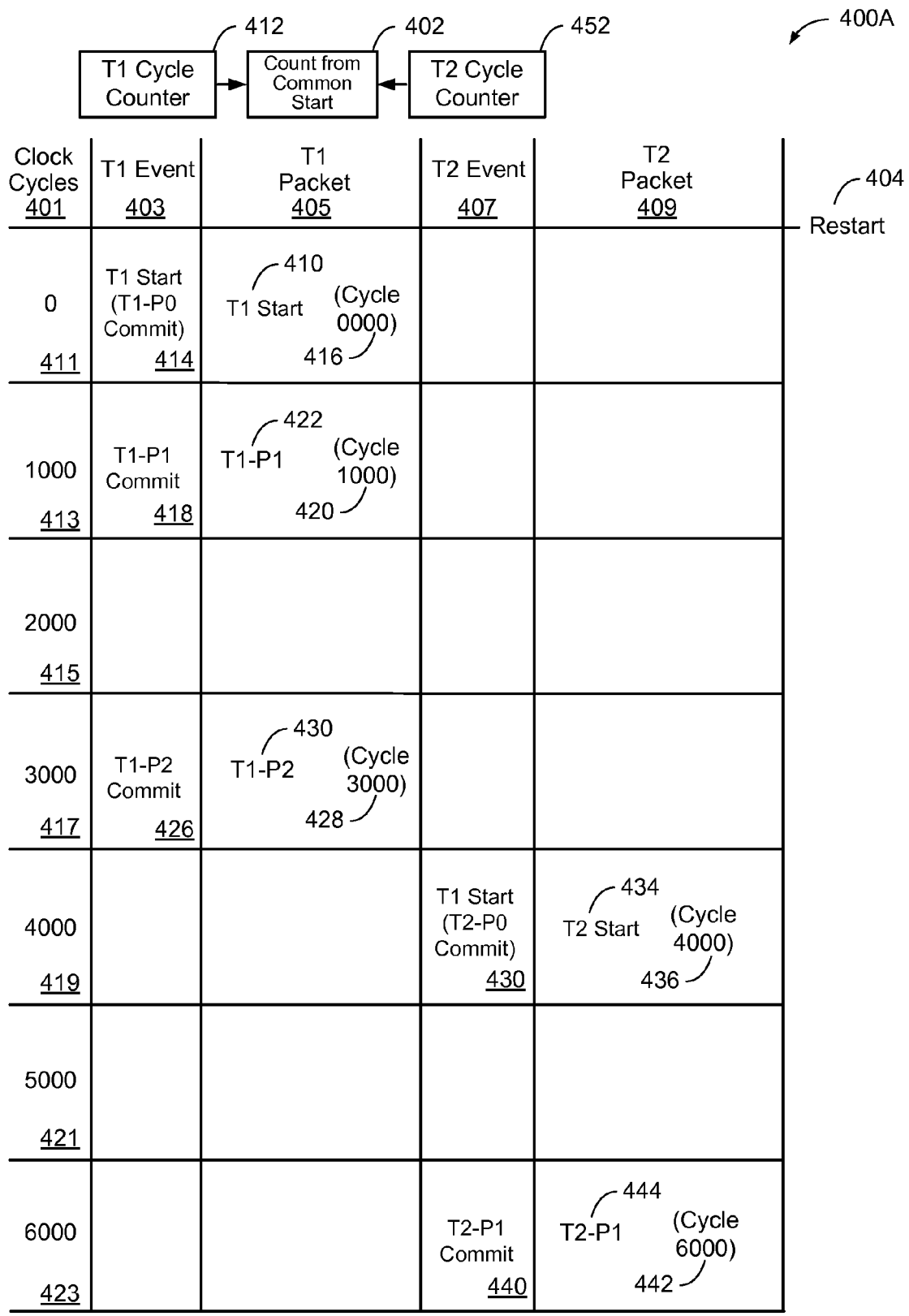
Figure 4B:
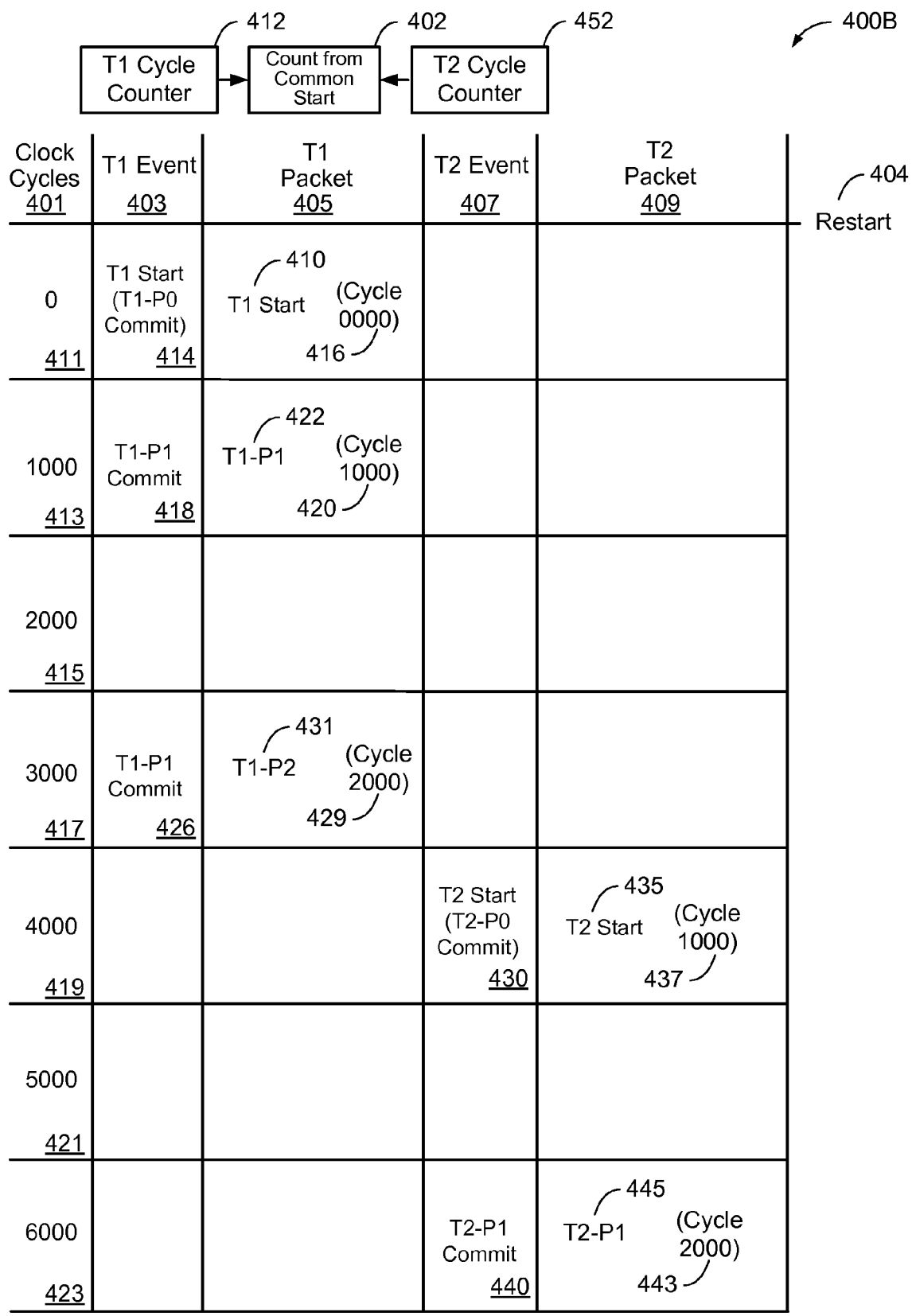
Figure 5A:
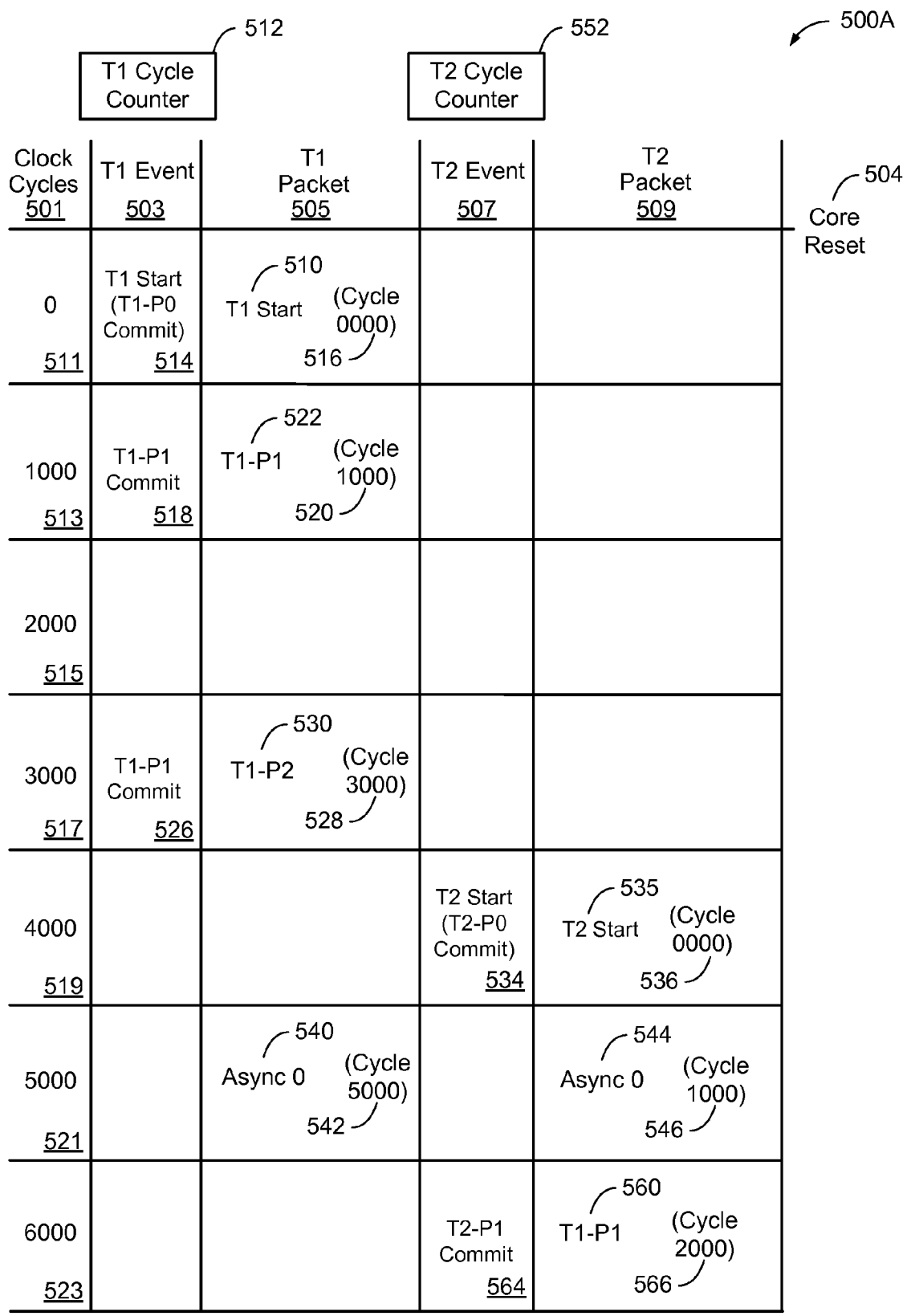
Figure 6:
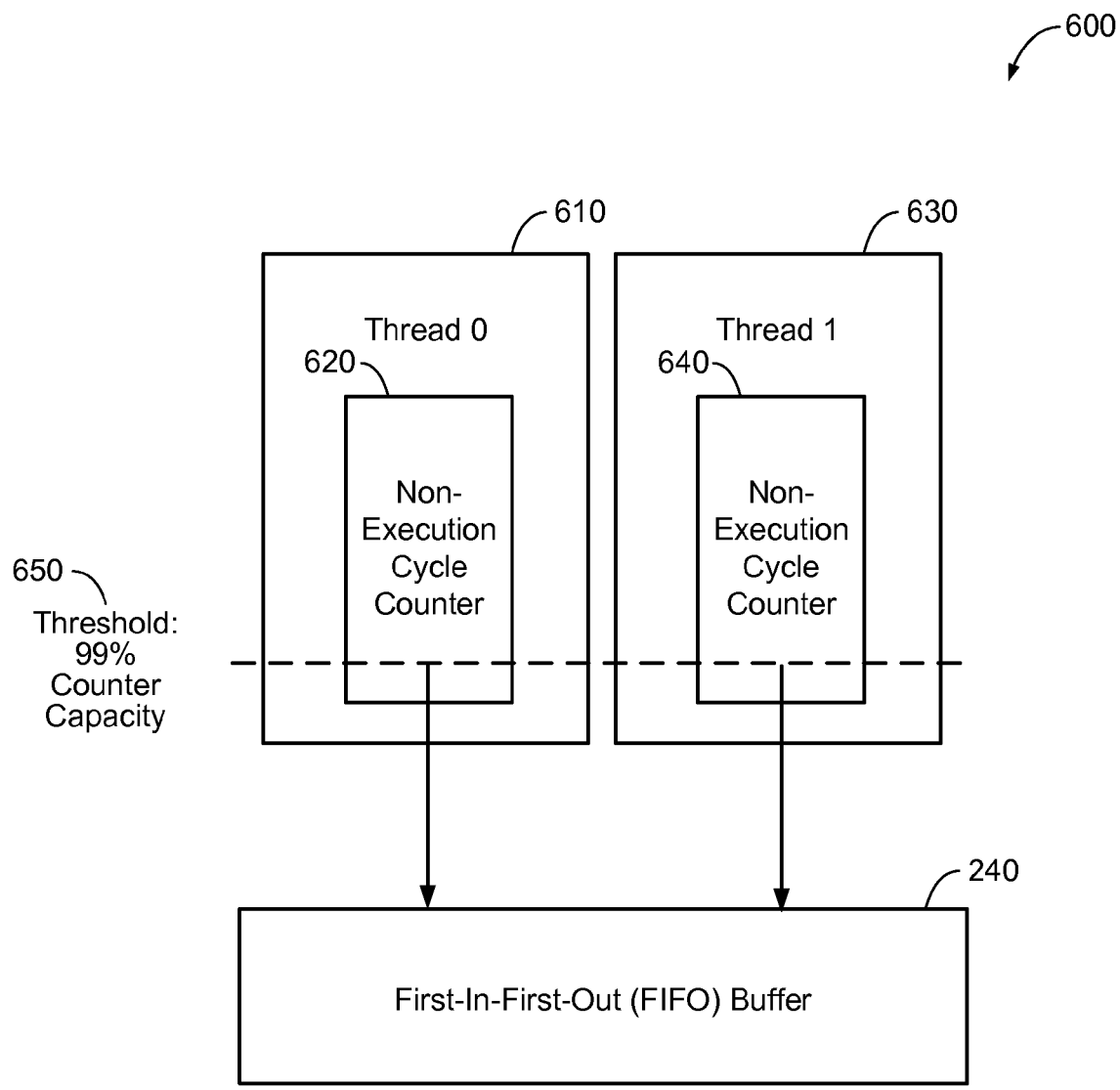
Figure 7:
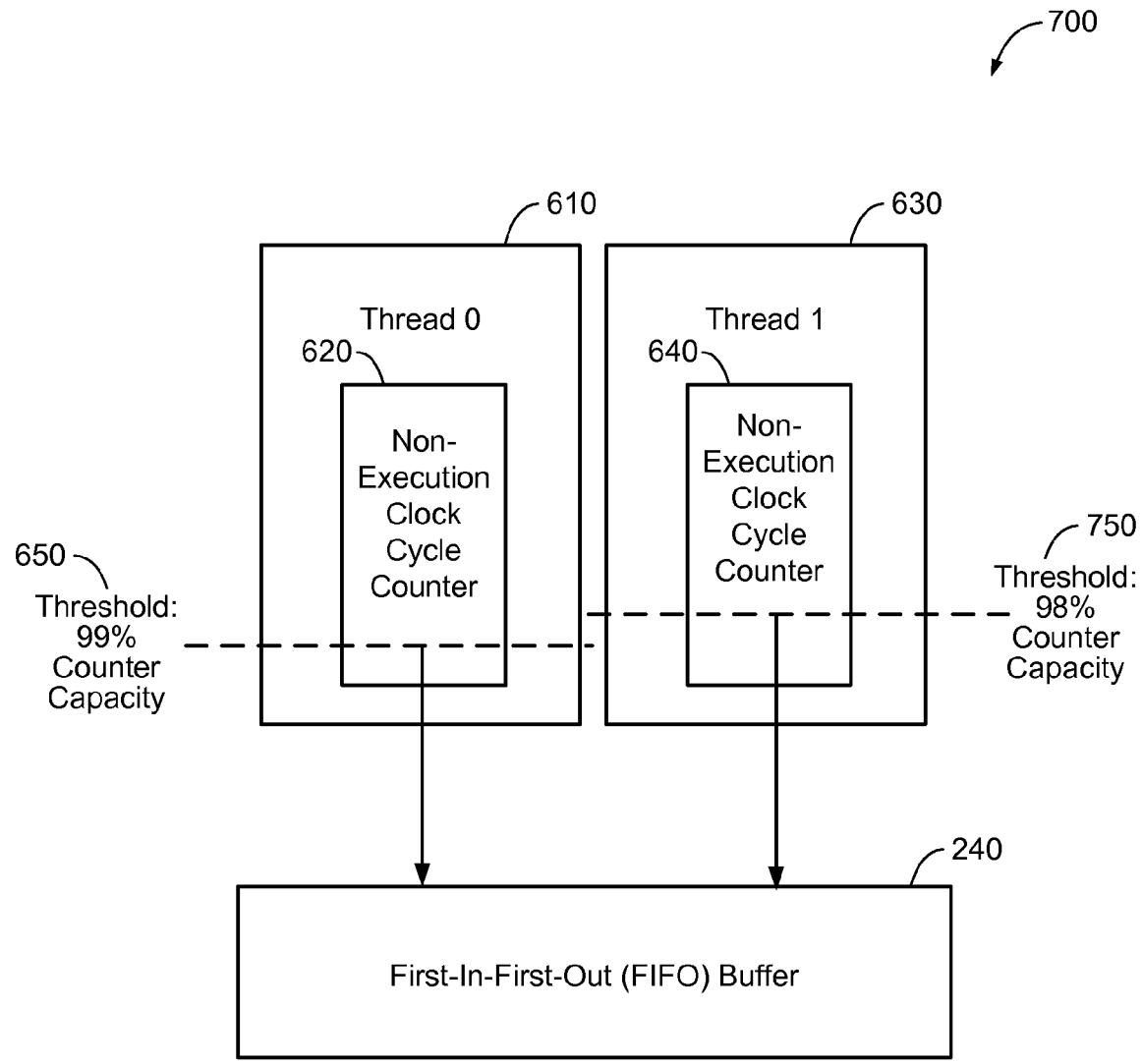
Figure 8:
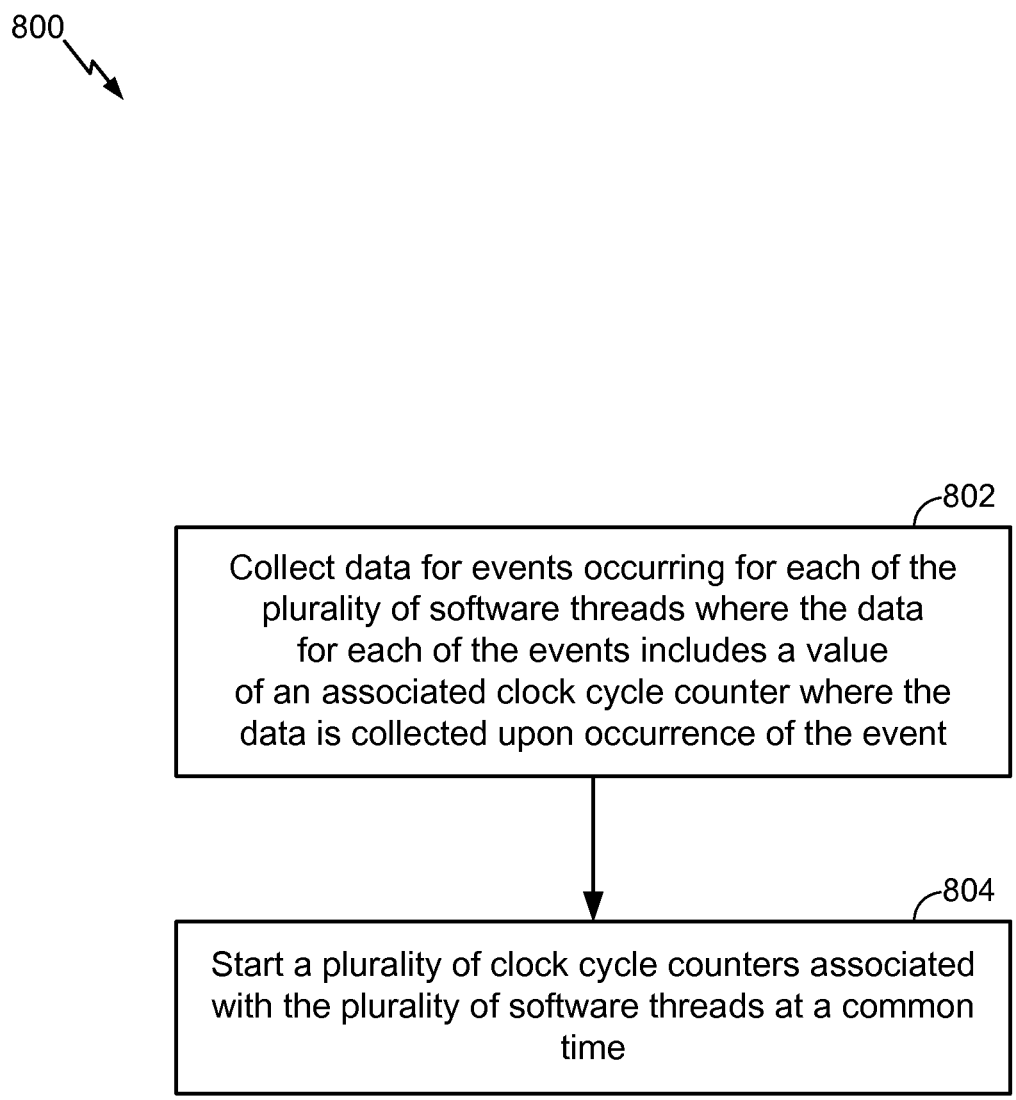
Figure 9:
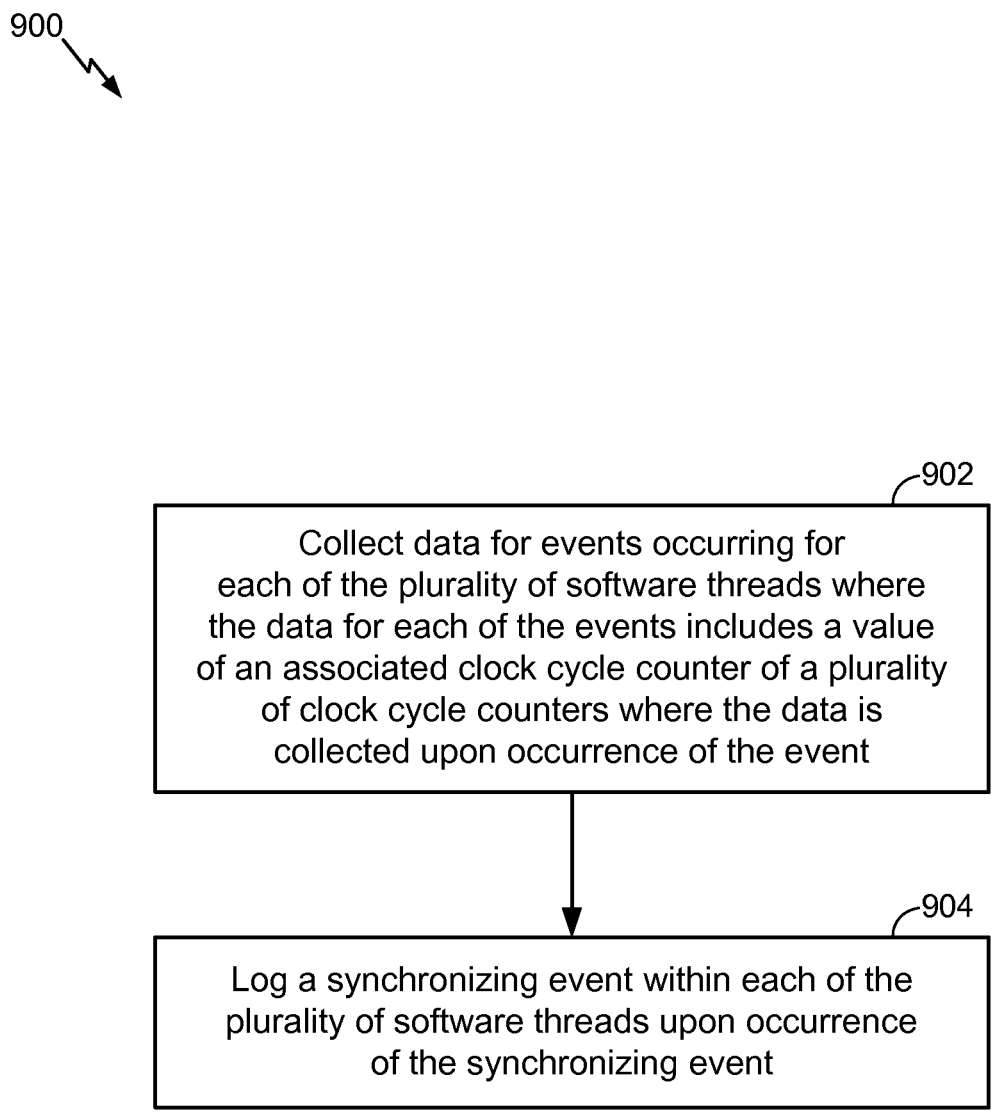
Figure 10:
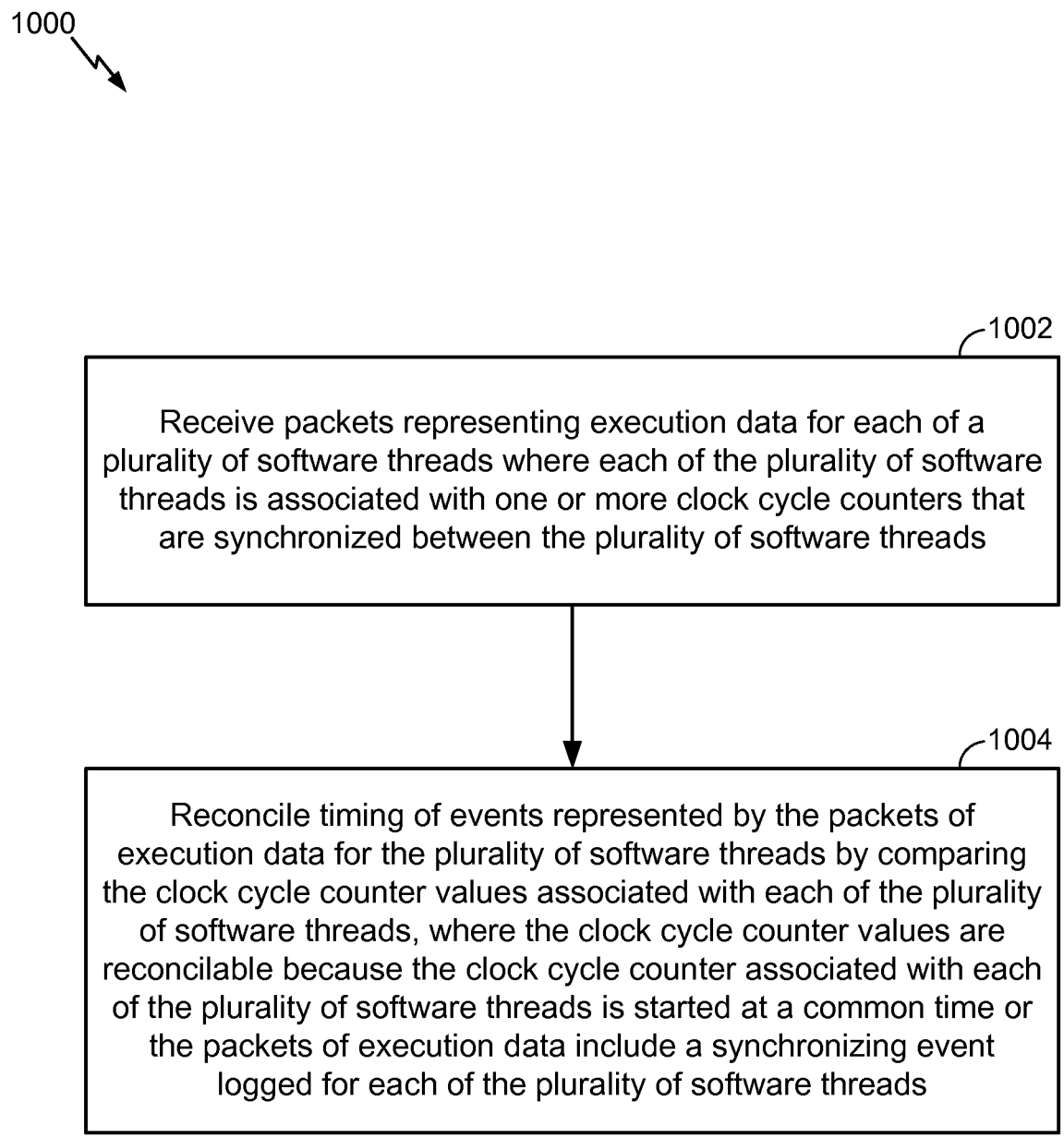
Figure 11:
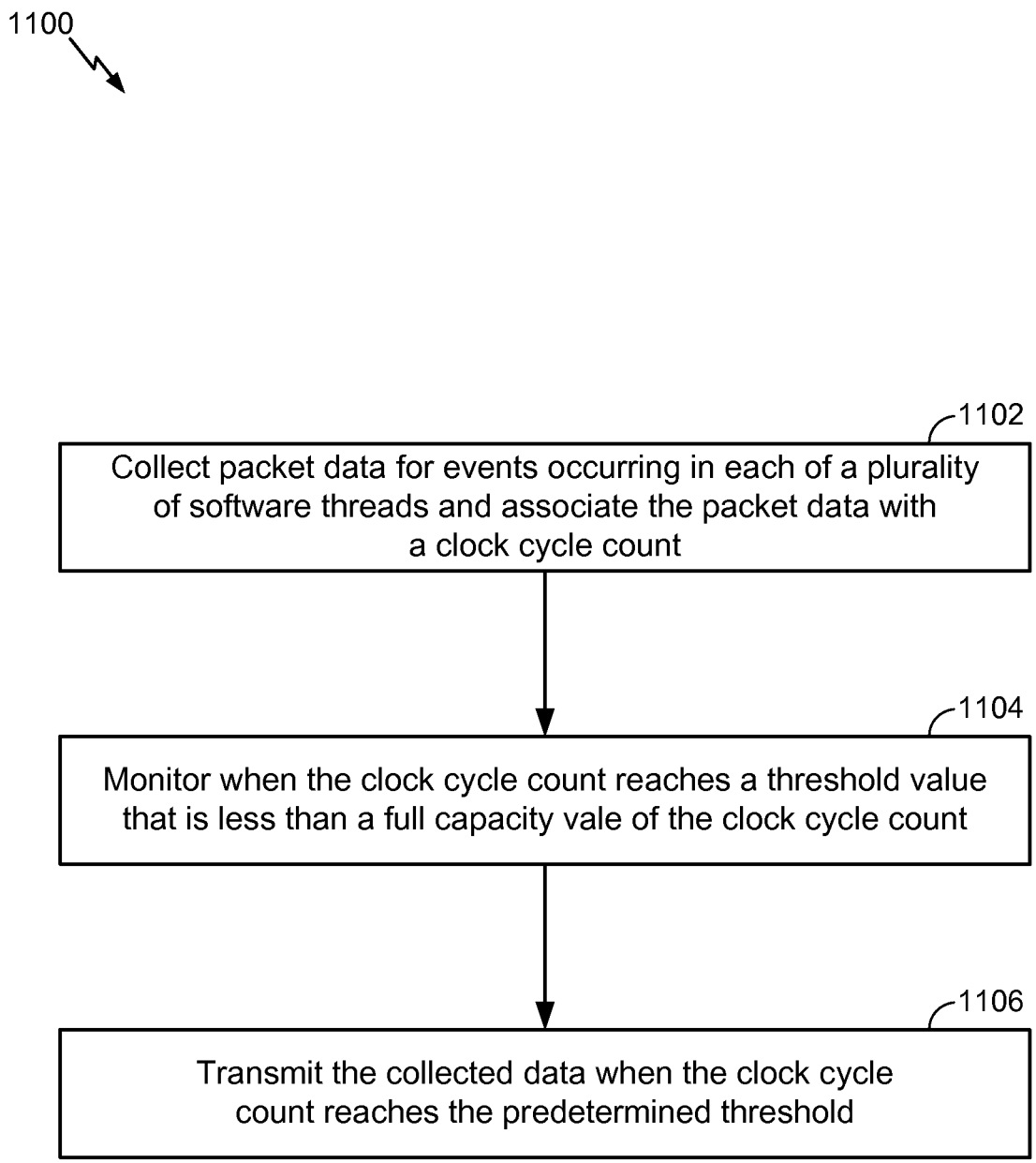
Figure 12:
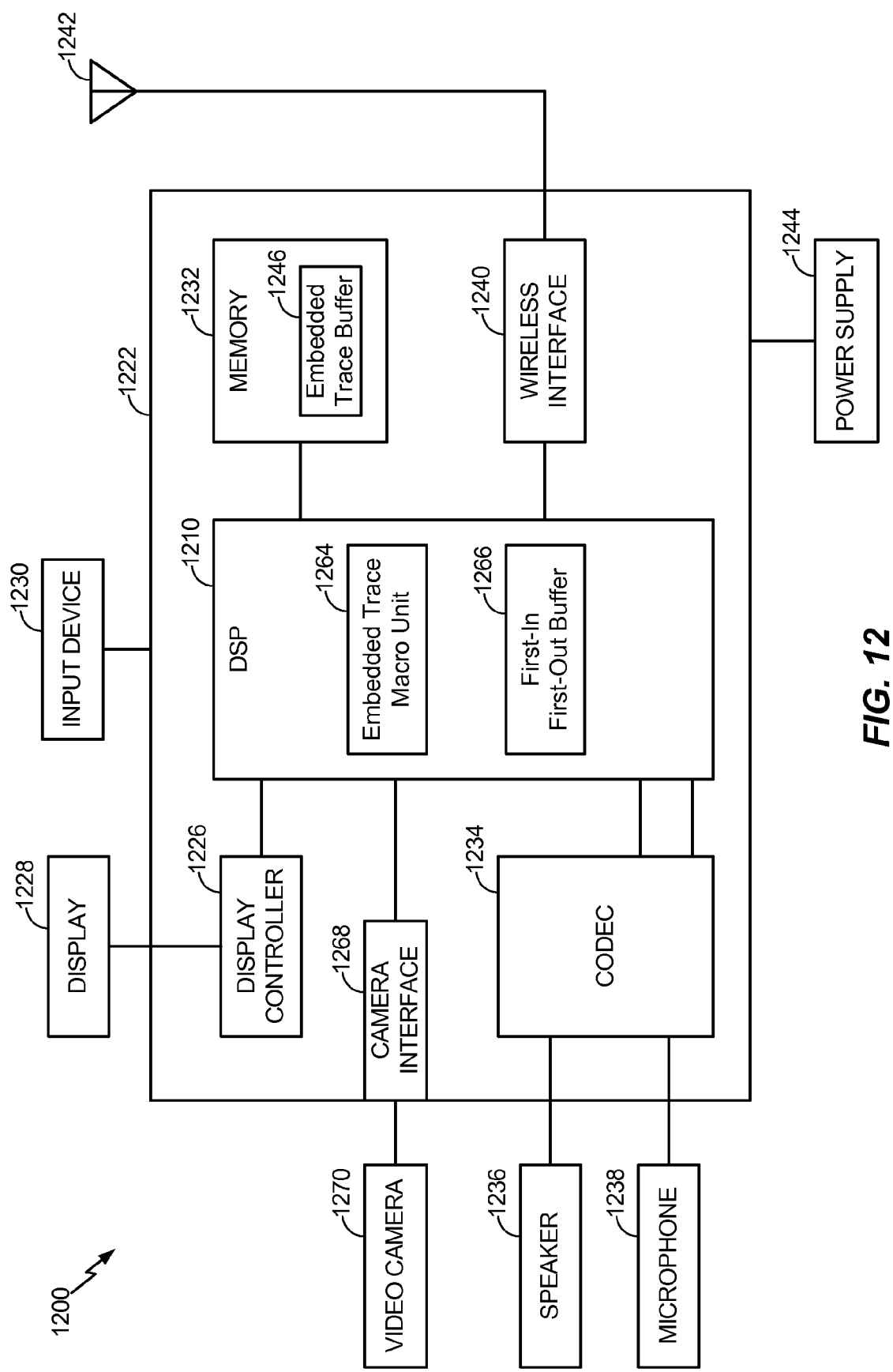
Figure 13:
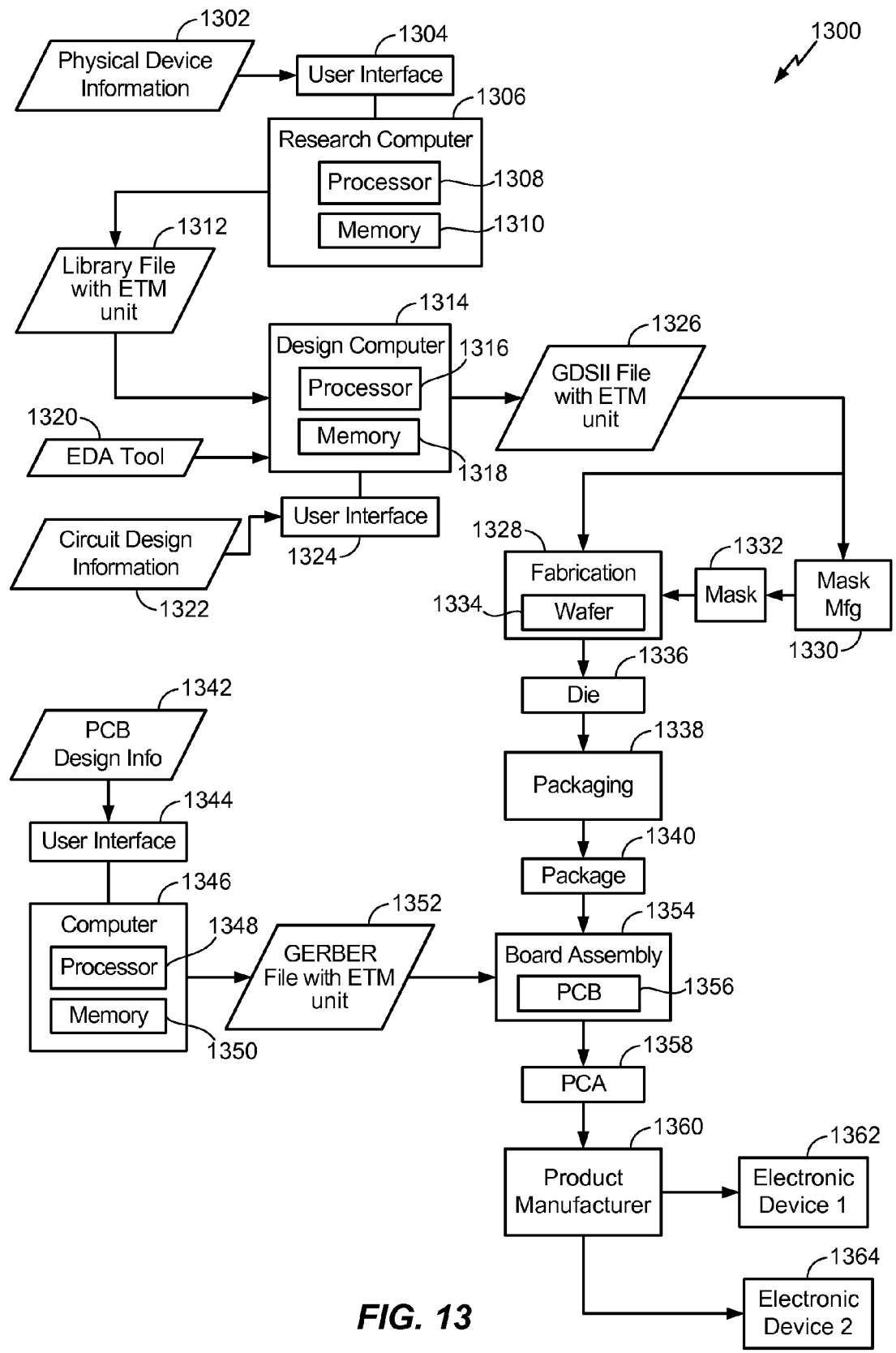

FIGS. 4A and 4B each present tables showing the events and resulting packets logged after a number of clock cycles for two threads operating using synchronized clock cycle counters according to particular embodiments of the present disclosure;

FIGS. 5A-5C each present tables showing the events and resulting packets logged after a number of clock cycles for two threads in which a synchronizing event is logged in each of the threads according to a particular embodiment of the present disclosure;

FIG. 6 is a block diagram of a multi-threaded processing system in which clock cycle counters are configured to generate clock cycle count packets at a threshold before the clock cycle counters reach a maximum clock cycle count value;

FIG. 7 is a block diagram of a multi-threaded processing system in which clock cycle counters associated with different threads are configured to generate clock cycle count packets at different thresholds before each of the respective clock cycle counters reach a maximum clock cycle count value;

FIG. 8 is a flow diagram of particular illustrative embodiment of generating event data using synchronized clock cycle counters for a plurality of software threads;

FIG. 9 is a flow diagram of particular illustrative embodiment of generating event data for a plurality of software threads where data for a synchronizing event is logged for each of the plurality of software threads;

FIG. 10 is a flow diagram of particular illustrative embodiment of reconciling event data generated for multiple software threads when the clock cycle counters are synchronized or a synchronizing event is logged in the multiple software threads;

FIG. 11 is a flow diagram of particular illustrative embodiment of outputting clock cycle count data at a threshold before the clock cycle count is reached;

FIG. 12 is a block diagram of a communications device that includes a processor using a particular illustrative embodiment of an embedded trace macro unit as described with reference to FIGS. 1-11; and FIG. 13 is a data flow diagram of a method of manufacturing electronic devices that include a particular illustrative embodiment of an embedded trace macro unit as described with reference to FIGS. 1-11.

V. DETAILED DESCRIPTION

In a multiple core processor or a multi-threaded processor, embodiments of the present disclosure can facilitate software debugging by providing information that enables timing reconciliation of different threads. According to embodiments of the present disclosure, clock cycle counters used by each of the different threads may be reset to a common count so that packets generated for each of the different threads will include clock cycle counts relative to a common starting point. Alternatively, when a particular event occurs in one thread, such as a reset for one of the threads, the event is logged in each of the threads such that occurrence of other events in each of the threads may be compared to the occurrence of the event logged in each of the threads. Also, to prevent packets relaying the clock cycle counts from being overwritten or lost due to a buffer overflow, clock cycle counters for each of the threads may be configured to write out clock cycle count packets to the buffer before the counter reaches its capacity. Each of the threads may be configured to write out clock cycle count packets at different points relative to the clock cycle counter overflow.

Configuring the clock cycle counters to be reset at a common time may increase the possibility that each of the threads will seek to write out the clock cycle count packets to the buffer at a same time. Configuring the different clock cycle counters to write out clock cycle count packets before they reach capacity may enable the packets in the buffer to be communicated off-chip before clock cycle count packets from other threads are written to the buffer, thereby reducing the likelihood of buffer overflow and loss of clock cycle count packet data.

Figure 1:
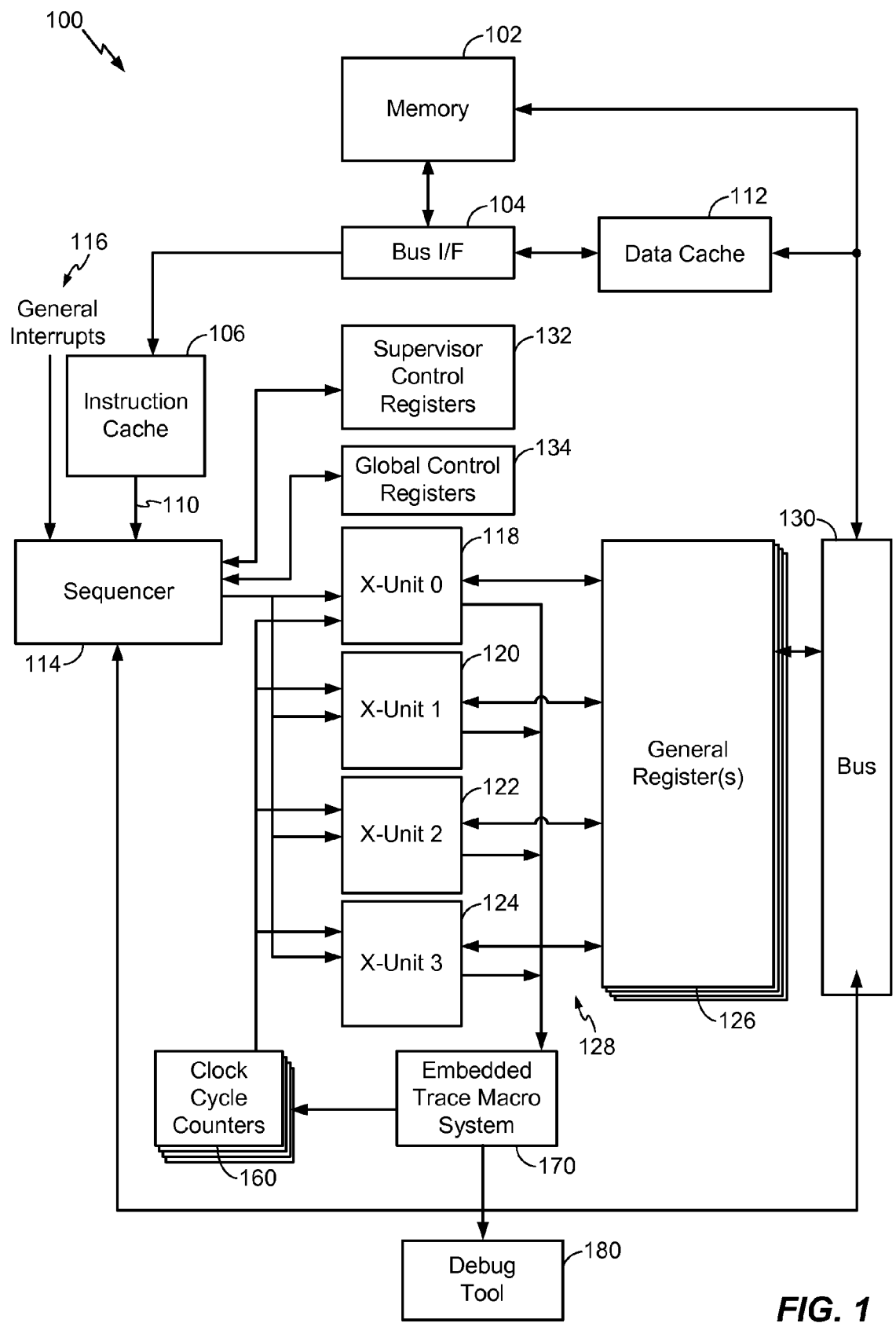
FIG. 1 is a block diagram of a particular illustrative embodiment of a system including an embedded trace macro system in an interleaved multi-threaded processor.

FIG. 1 is a block diagram of a particular illustrative embodiment of a multi-threaded processing system 100 that employs clock cycle counters 160 that each may be reconciled to a common clock count or a commonly logged occurrence of an event and written out to a buffer prior to counter overflow. The processing system 100 includes a memory 102 that is adapted to communicate with an instruction cache 106 and a data cache 112 via a bus interface 104. The instruction cache 106 is coupled to a sequencer 114 by a bus 110. Additionally, the sequencer 114 is adapted to receive interrupts, such as general interrupts 116, which may be received from an interrupt register. The sequencer 114 is also coupled to supervisor control registers 132 and global control registers 134. In a particular embodiment, the instruction cache 106 is coupled to the sequencer 114 via a plurality of current instruction registers, which may be coupled to the bus 110 and associated with particular threads of the processing system 100.

In a particular embodiment, the processing system 100 is an interleaved multi-threaded processor including six hardware threads configured to concurrently support up to six software threads. The hardware threads are executed by four different execution units: a first instruction execution unit 118, a second instruction execution unit 120, a third instruction execution unit 122, and a fourth instruction execution unit 124 that may be used to execute multiple operations in parallel. To control the execution of the software threads, the sequencer 114 is coupled to each of the execution units 118, 120, 122, and 124 and, in one embodiment, controls the allocation of software threads between the execution units 118, 120, 122, and 124.

Each instruction execution unit 118, 120, 122, and 124 can be coupled to a general register file 126 via a second bus 128. The general register file 126 can also be coupled to the sequencer 114, the data cache 112, and the memory 102 via a third bus 130. The supervisor control registers 132 and the global control registers 134 may store bits that may be accessed by control logic within the sequencer 114 to determine whether to accept interrupts and to control execution of instructions. In one particular embodiment, the processing system is configured to support six hardware threads configured to execute up to six software threads of which the instructions may be interleaved to take advantage of the performance and aggressive clocking of the execution units 118, 120, 122, and 124 of the processing system 100.

According to a particular embodiment, the system 100 provides one or more clock cycle counters 160 that are used to count clock cycles for each software thread that is executing. For example, the clock cycle counters 160 may count the number of clock cycles when the thread is in an execution phase, the number of clock cycles when the thread is in a non-execution phase, etc. The clock cycle counters 160 may be under the control of an embedded trace macro (ETM) system 170 that controls when the clock cycle counters 160 are reset and when the threads write out the clock cycle count packets to the ETM system 170, as further described below. The ETM system 170 includes a buffer (not shown in FIG. 1), such as a first-in-first-out (FIFO) buffer that receives clock cycle count packets, as well as data execution and data non-execution packets. The buffer stores the packets and sends the packets via a trace port (not shown in FIG. 1) to a debug tool 180 to facilitate software debugging. It will be appreciated that the executions units 118, 120, 122, and 124 of the multi-threaded processing system 100 may be clocked at a much faster clock rate than, for example, the buffer, thus, data packets may accumulate in the buffer faster than they can be communicated via the trace port. As further described below, embodiments of the present disclosure operate to relieve buffer contention and overflow to prevent loss of packets that may be used in debugging.

Figure 2:
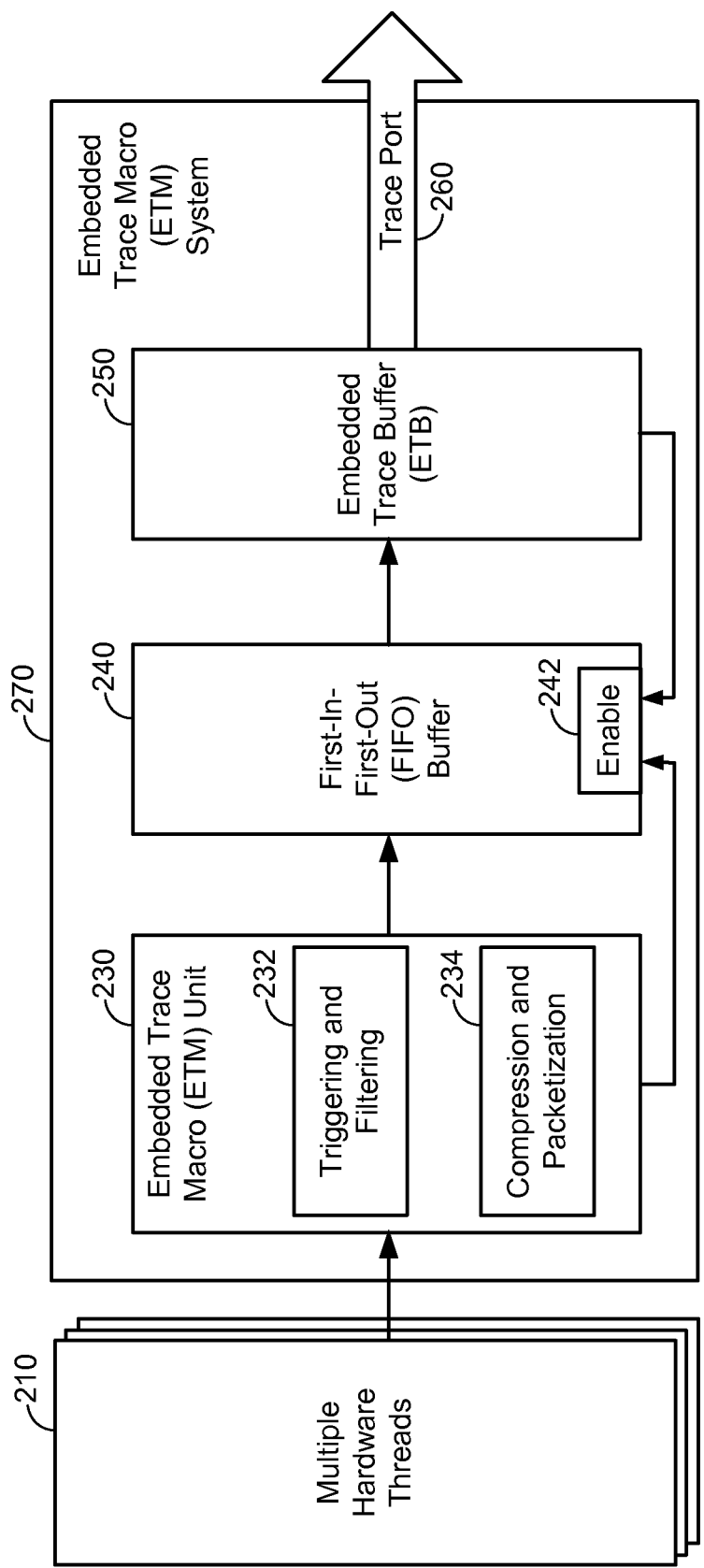
FIG. 2 is a block diagram of a particular illustrative embodiment of the embedded trace macro system of FIG. 1.

FIG. 2 is a block diagram of the embedded trace macro system 270. In an illustrative embodiment, the embedded trace macro system 270 includes the embedded trace macro system 170 of FIG. 1. According to an embodiment as previously described with reference to FIG. 1, the embedded trace macro system 270 receives clock counter data from multiple threads executing on multiple hardware threads 210 executed on multiple execution units, such as the execution units 118, 120, 122, and 124 of FIG. 1. An ETM unit 230 includes a triggering and filtering unit 232 that controls when tracing is on or off for the different hardware threads 210 so as to generate clock count packet data, as further explained below. The ETM unit 230 also includes a compression and packetization unit 234 that collects and compresses the clock counter data received from the separate hardware threads 210 into packets that are output to facilitate debugging. The ETM unit 230 is coupled to a FIFO buffer 240 in which the packet data is stored until it is passed to an embedded trace buffer (ETB) 250 that outputs the packet data via a trace port 260. The packet data output via the trace port 260 is received by a debugging system, such as the debugging system 180 of FIG. 1, where it is used to debug problems with software threads executing on the multiple hardware threads 210.

According to a particular embodiment, one of or both of the ETM unit 230 and the ETB 250 are configured to control an enable input 242 on the FIFO buffer 240 to control the output of the packets from the FIFO buffer 240 to the ETB 250. As further described below, the ETM unit 230 may be configured to cause the FIFO buffer 240 to communicate the packet data via the ETB 250 to pass data out of the FIFO buffer 240 to prevent overflow of the FIFO buffer 240. Also, the ETB 250 may be configured to cause the FIFO buffer 240 to output packet data when the ETB 250 determines that the ETB 250 is able to presently communicate packet data via the trace port 260. Communicating the packet data from the ETB 250 via the trace port 260 when an opportunity to communicate packet data is detected may help to prevent overflow in the FIFO buffer 240.

Figure 3:
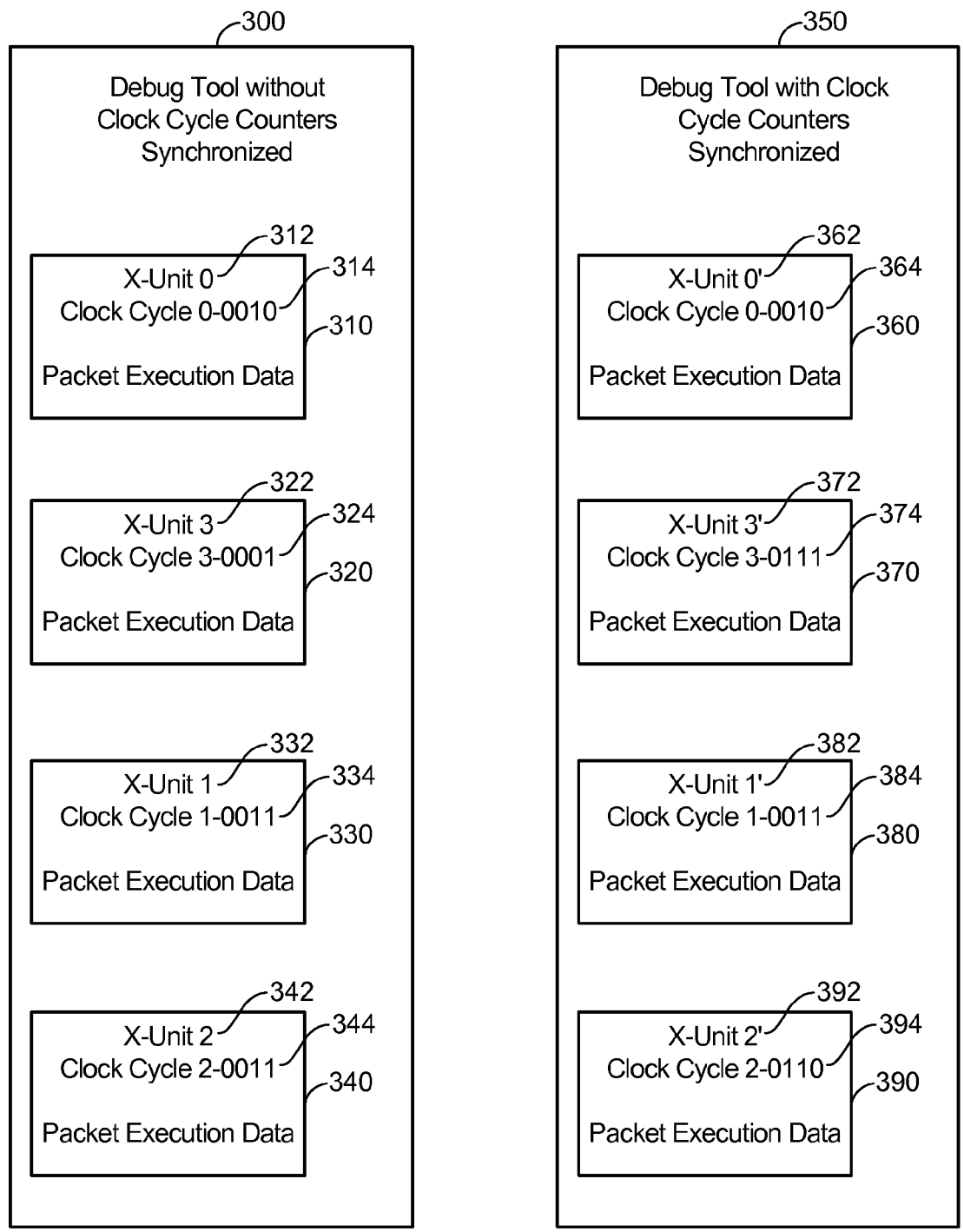
FIG. 3 is a block diagram of two sets of packet data including a set of packet data based on synchronized clock cycle counters to facilitate debugging.

FIG. 3 is a block diagram of two sets of packet data 300 and 350 to illustrate how particular embodiments of the present disclosure may simplify debugging by synchronizing clock cycle counters maintained for and used by multiple hardware threads in a multi-processing environment. Although in some embodiments the clock cycle counters may include 32-bit counters or larger counters, for sake of simple illustration, the clock cycle counters are shown as binary four-bit counters.

A first set of packet data 300 illustrates packet data received by a debug tool when the packet data is generated without using synchronized clock cycle counters. The first set of packet data 300 includes a first packet 310 from a first hardware thread running on a first execution unit, X-Unit 0 312. The first packet 310 is generated at a clock cycle count of "0-0010" 314. (The prefix "0-" in clock cycle count 314, as in the other clock cycle counts 324, 334, and 344, represents the execution unit that the packet was received from.) The first set of packet data 300 also includes a second packet 320 from a thread executing on execution unit 3 322 generated at a clock cycle count of "3-0001" 324. The first set of packet data 300 also includes a third packet 330 from a thread executing on execution unit 1 332 and generated at a clock cycle count of "1-0011" 334. The first set of packet data 300 also includes a fourth packet 340 from a thread executing on execution unit 2 342 and generated at a clock cycle count of "1-0011" 324.

Assuming a problem with the software has occurred and the first set of packet data 310 is used to debug the software, it is possible that the problem arose from a conflict between the operation of one of the threads executing on one of the execution units 312, 322, 332, and 342 and the operations of one of the threads executing on another of the execution units 312, 322, 332, and 342. However, making such a determination may be difficult due to autonomous operation of the clock cycle counters of the threads executing on the execution units 312, 322, 332, and 342. Because packets are written to a FIFO buffer (e.g., the FIFO buffer 240 of FIG. 2) based on when an event (e.g., a reset, a data commit, etc.) occurs, there may be no way to determine the order in which the data packets 310, 320, 330, and 340 were written. Thus, it may be difficult to determine how the operations of a thread executing on one of the execution units 312, 322, 332, and 342 may have affected the operation of a thread executing on another of the execution units 312, 322, 332, and 342. If it cannot be determined in what order the packets 310, 320, 330, and 340 were generated, it may be difficult to determine whether execution of one or more threads was affected by execution of any of the other threads.

By contrast, a second set of packet data 350 illustrates packet data received by a debug tool in which the packet data is generated using clock cycle counters that are synchronized between executing threads. For the sake of differentiation, while the execution units are designated as X-Unit 0 312, X-Unit 1 332, X-Unit 2 342, and X-Unit 3 322 for the first set of packet data 300 without clock counters being synchronized 300, the execution units are designated as X-Unit 0' 362, X-Unit 1' 382, X-Unit 2' 392, and X-Unit 3' 372 for the second set of packet data 350 with synchronized clock cycle counters. For example, when any one of the execution units is reset, the clock cycle counter for the threads executing on each of the execution units may be reset. For the example of FIG. 3, assume that each of the packets 360, 370, 380, and 390 was issued by each of the execution units based on the occurrence of the same events and at the same time that each of the sets of the packets 310, 320, 330, and 340 was generated. The second set of packet data 350 includes a first packet 360 from a thread executing on X-Unit 0' 362 and generated at a clock cycle count of 0-0010 364. The second set of packet data 350 also includes a second packet 370 from a thread executing on X-Unit 3' 372 generated at a clock cycle count of 3-0111 374. The second set of packet data 350 also includes a third packet 380 from a thread executing on X-Unit 1' 382 generated at a clock cycle count of 1-0011 384. The second set of packet data 350 also includes a fourth packet 390 from a thread executing on X-Unit 2' 392 generated at a clock cycle count of 2-0110 394.

When the clock cycle counters for the threads executing on each of the execution units 362, 372, 382, and 392 are synchronized, the process of determining when each of the packets 360, 370, 380, and 390 was generated by each of the respective software threads is simplified. Based on the clock cycle counts and ignoring the prefixes that identify the source of the packet, the clock cycle counts may be chronologically sequenced in the order 0-0010 364, 1-0011 384, 2-0110 394, and 3-0111 374, thus indicating the order in which the packets were issued. By comparison with the first set of packet data 300, the order in which the packets 310, 320, 330, and 340 cannot be so readily determined from the non-synchronized clock cycle counts 314, 324, 334, and 344, where the clock cycle counters are set and reset individually from one another.

FIG. 4A shows a table 400A showing events and packets logged for two software threads operating using synchronized clock cycle counters according to a particular embodiment of the present disclosure. The table 400A includes columns for a clock cycle count 401, first thread (T1) events 403, first thread (T1) packets 405, second thread (T2) events 407, and second thread (T2) packets 409. The table 400A also includes rows for events that may occur at zero (0) clock cycles 411, 1000 clock cycles 413, 2000 clock cycles 415, 3000 clock cycles 417, 4000 clock cycles 419, 5000 clock cycles 421, and 6000 clock cycles 423. The clock cycle count column 401 represents a number of clock cycles that have occurred but, as described with reference to illustrative embodiments of the present disclosure, different threads may maintain independent clock cycle counts to be associated with data packets. Thus, a first clock cycle counter (T1 cycle counter) 412 is maintained for the first thread and a second clock cycle counter 452 is maintained for the second thread. According to one particular illustrative embodiment, both the first clock cycle counter 412 (T1 cycle counter) and the second clock cycle counter (T2 cycle counter) 452 count from a common start point 402, such as a restart of one or more threads 404. Counting from a common start point 402 enables correlation of events occurring in each of the threads to the common start point 402.

A first thread start (T1 start) 414 may occur at clock cycle count 0 411. The first thread start 414 may occur when ETM packets are first committed. Thus, the first thread start 414 may be the time for the committing of the first thread and the initial data commit and may be referred to as "T1-Start" or "T1-P0 Commit." The first thread start results in generation of a T1 start packet 410 that bears the clock cycle count 0000 416. A subsequent first data commit (T1-P1) 418 occurs at clock cycle 1000 413, resulting in generation of a T1-P1 packet 422 that bears the clock cycle count 1000 420. After passage of an additional 2000 clock cycles at clock cycle 3000 417 a first thread, second data commit (T1-P2) 426 occurs, resulting in generation of a T1-P2 packet 430 that bears the clock cycle count 3000 428.

After another 1000 cycles at clock cycle 4000 419 a second thread start 430, designated as "T2 Start" or "T2-P0 Commit" in FIG. 4A, occurs, resulting in generation of a T2 start packet 434 bearing the clock cycle count 4000. After an additional 2000 cycles at clock cycle count 6000 423 a first data commit in the second thread (T2-P1) 440 occurs resulting in generation of a T2-P1 packet 444 that bears the clock cycle 6000 442.

Because the first thread and the second thread are based on clock cycle counters 412 and 452 running from a common start 402, the clock cycle count values included in the data packets 410, 422, 434, and 444 represent the chronological sequence in which the data packets 410, 422, 434, and 444 were issued. Thus, if operation of one of the threads interferes with operation of another thread, the causal connection may be more readily determined because the sequence of events resulting in the writing of the data packets 410, 422, 434, and 444 may be determined.

By contrast, if the clock cycle counters 412 and 452 were based on independently set clock cycle counters that began counting, for example, at the start of each respective thread 414 and 430, it may be more difficult to reconcile the execution of the different threads to determine a potential causal connection. For example, if the first clock cycle counter 412 were started from the first thread start 414, the T1-P2 packet 426 would still bear the clock cycle count 3000 428. However, if the second clock cycle counter 452 were started from the second thread start 430, the T2-P1 packet 444 would occur 2000 clock cycles after the second thread start 430 and would bear the clock cycle count of 2000. By comparing the clock cycle counts included in the T1-P2 packet 430 of 3000 cycles and the T2-P1 packet 444 of 2000 cycles, it cannot be determined that the event causing the T1-P2 packet 430 to be written occurred before the event causing the T2-P1 packet 444 to be written. By using a count from common start 402 for the first clock cycle counter 412 and the second clock cycle counter 452, this potential mistake may be avoided.

FIG. 4B illustrates an alternative illustrative embodiment in which the clock cycle counters are reset as each ETM packet is committed. Each ETM packet bears the cycle count at the time the ETM packet was committed, but each of the clock cycle counters is reset so that the cumulative clock cycle count values do not become large.

FIG. 4B shows a table 400B for two software threads operating using synchronized clock cycle counters according to a particular embodiment of the present disclosure. A first clock cycle counter (T1 cycle counter) 412 is maintained for a first data thread, and a second clock cycle counter (T2 cycle counter) 452 is maintained for a second data thread. Both the first clock cycle counter 412 and the second clock cycle counter 452 are reset when each ETM packet commits.

A first thread start 414, designated T1 start (or T1-P0 commit), may occur when ETM packets are first committed. A subsequent first data commit (T1-P1) 418 occurs after 1000 clock cycles at clock cycle count 1000 413, resulting in generation of a T1-P1 packet 422 that bears the clock cycle count 1000 420. In the illustrative embodiment of FIG. 4B, the value of the T1 cycle counter 412 and other cycle counters is then reset to zero. After passage of an additional 2000 clock cycles at clock cycle count 3000 417 a first thread, second data commit (T1-P2) 426 results in generation of a T1-P2 packet 431 that bears the clock cycle count 2000 429. By comparison with table 400A of FIG. 4A, the T1-P2 commit packet 430 bore the clock cycle count 3000 428 because the T1 cycle counter did not reset at T1-P1 commit 418.

After another 1000 cycles at clock cycle count 4000 419, a second thread start 430, designated as T2 start or (T2-P0 commit), occurs. Because 1000 clock cycles passed since the last reset of the T1 cycle counter 412 and the T2 cycle counter 452, the T2-Start packet 435 bears the clock cycle count 1000 437. After an additional 2000 cycles at clock cycle count 6000 423 a first data commit in the second thread (T2-P1) 440 results in generation of a T2-P1 packet 445 that bears the clock cycle count 2000 443.

The T1 clock cycle counter 412 and T2 clock cycle counter 452 are reset each time an ETM packet is committed. Thus, the relative clock cycle count values may be used to correlate the occurrence of events represented by the ETM packets. Committing the data packets each time the clock cycle counters are reset preserves the uniqueness of the clock cycle counts for the data threads between resets of the clock cycle counters.

Other particular embodiments of the present disclosure may provide other ways for the clock cycle counts of different threads to be reconciled. For example, by logging a common event in each of a plurality of threads, the relative sequence in which events occurred in each of the threads may be determined by comparison to the clock cycle count value assigned to the common event in each of the threads, as described with reference to FIGS. 5A-5C.

FIG. 5A is a table 500A showing events and packets logged for two software threads operating using synchronized clock cycle counters according to another particular embodiment of the present disclosure. The table 500A includes columns for a clock cycle count 501, first thread (T1) events 503, first thread (T1) packets 505, second thread (T2) events 507, and second thread (T2) packets 509. The table 500A also includes rows for events that may occur at zero (0) clock cycles 511, 1000 clock cycles 513, 2000 clock cycles 515, 3000 clock cycles 517, 4000 clock cycles 519, 5000 clock cycles 521, and 6000 clock cycles 523. As is the case for tables 400A and 400B of FIGS. 4A and 4B, the clock cycle count column 501 represents a number of clock cycles that have occurred but, as described with reference to illustrative embodiments of the present disclosure, different threads may maintain independent clock cycle counts to be associated with data packets.

In contrast to the example of FIGS. 4A and 4B, a first clock cycle counter 512 maintained for the first data thread and a second clock cycle counter 552 maintained for a second data thread may not count from a common start point. Instead, each of the clock cycle counters 512 and 552 may begin to count with the start of each of the respective threads.

A first thread start T1 start 514 (or a first thread, initial data commit referred to as T1-P0) may occur at clock cycle count 0 511. A T1 start data packet 510 is generated that bears the clock cycle count 0000 516. A subsequent first thread, first data commit (T1-P1) 518 occurs at clock cycle count 1000 513 resulting in generation of a T1-P1 packet 522 that bears the clock cycle count 1000 520. After passage of an additional 2000 clock cycles at clock cycle count 3000 517 a first thread, second data commit (T1-P2) 526 occurs, resulting in generation of a T1-P2 packet 530 that bears the clock cycle count 3000 528.

After another 1000 cycles at clock cycle count 4000 419 a second thread start T2 Start 534 (or a second thread, initial data commit referred to as T2-P0) occurs. According to the illustrative embodiment of FIG. 5A, the second clock cycle counter 552 begins to count with the start of the respective thread. Thus, for T2 Start 534, a T2 Start data packet 535 is generated with a clock cycle count of 0000 536.

After another 1000 cycles at clock cycle count 5000 521, a common event Async 0 may be logged in a packet 540 for the first thread and in a packet 544 for the second thread. The common event Async 0 may be associated with a designated event occurring in one of the timelines. For example, an event could be asynchronously generated by the triggering and filtering unit 232 of the ETM unit 230 (FIG. 2) for the purpose of generating the common event to be included in each of the timelines. The packet 540 generated for the common event Async 0 for the first thread carries a clock cycle count 5000 542, because 5000 clock cycles will have elapsed since the start of the clock cycle counter 512 at the first thread start 514. For the second thread, the packet 544 is generated for the common event Async 0 bearing a clock cycle count 1000 546, because 1000 clock cycles will have elapsed since the start of the second clock cycle counter 552 at the start of the second thread 534. After the common event is logged by packets 540 and 544 for each of the threads, other data packets may continue to be generated, such as a data packet 560 generated in the second thread after passage of another 1000 clock cycles at clock cycle 6000 523. A data packet 560 is logged for a first data commit in the second thread T2-P1 564, where the data packet 560 bears the clock cycle count value 2000 566 because the T2-P1 commit 564 occurred after the passage of 2000 clock cycles from T2 start, T2-P0 534.

As shown in FIGS. 5B and 5C, the start of another thread may be an event that results in a packet being logged within each of the threads to facilitate reconciling of the execution of different threads as desired for debugging. Recording in each thread when another thread starts execution may facilitate resolution of errors that result from execution of another thread.

FIG. 5B shows a table 500B showing events in each of two threads and packets logged for each of the two threads. A packet 570 is logged at Async 0 at T2 start (or T2-P0 commit) 534. A packet similar to the packet 570 may be logged for event Async 0 of all other threads, whether or not those threads are currently executing, to record the start of execution of the second thread. The packet 570 may include an indication 574 of the event that resulted in the packet 570 being committed. In this case, the indication 574 identifies T2 start (or T2-P0 commit) 534 as the event that caused the packet 570 to be generated. If the start of execution of another thread or occurrence of an event does not reset the T1 clock cycle counter 512, the packet 570 may bear the clock cycle count value 4000 572 because the packet 570 is logged after a total of 4000 clock cycles 519.

Correspondingly, 1000 clock cycles after T2 start (or T2-P0 commit) 534 at clock cycle count 5000 521, a third thread T3 begins execution. T3 Start results in a packet 580 being logged for the first thread and a packet 590 being logged for the second thread. The packet 580 may include an indication 584 of the event, T3 Start (or T3-P0 commit), that resulted in the packet 580 being generated. The packet 580 bears a clock cycle count of 5000 582 because T3-P0 occurred 5000 clock cycles after the start of the first thread. The packet 590, which also may include an indication of the event 594 resulting in the packet being generated, includes a clock cycle count value 1000 592 because 1000 cycles have passed since the start of the second thread.

According to the particular embodiment as described with reference to FIG. 5B, the T1 cycle counter 512 and the T2 cycle counter 552 are not reset with the committing of packets. Alternatively, the T1 cycle counter 512 and the T2 cycle counter 552 may be reset with the committing of a packet in any of the threads, as shown in FIG. 4B, or the clock cycle counters 512 and 552 may be reset with the generation of a packet indicating the start of any of the threads in the system, as shown in FIG. 5C.

FIG. 5C shows a table 500C for a first thread and a second thread. A packet 570 is logged for Async 0 at T2 start (or T2-P0 commit) 534 in the first thread. In the illustrative embodiment of FIG. 5C, the committing of a packet resulting from the beginning of execution of one of the system threads results in a reset of the T1 cycle counter 512 and the T2 cycle counter 552, as well as any other clock cycle counters for other threads (not shown). In particular, T2 start (or T2-P0 commit) 534 results in the clock cycle counters 512 and 552 being reset. Thus, at clock cycle 5000 521, a third thread T3 (not shown in FIG. 5C) begins execution resulting in a packet 580 being logged for Thread 1 511 and a packet 590 being logged for Thread 2 551, as in the illustrative embodiment of FIG. 5B. However, in contrast to the illustrative embodiment of FIG. 5B, because the clock cycle counters 512 and 552 both were reset at T2 Start 534 the packet 580 bears a clock cycle count value of 1000 cycles 583 and the packet 590 bears a clock cycle count of 1000 cycles 593. Also, because T3 Start again will reset the clock cycle counters 512 and 552, a packet 560 logged for T2-P1 commit 564 bears the clock cycle count of 1000 567.

When the data packets are collected in a debug tool, such as the debug tool 180 (FIG. 1), the execution of the threads can be reconciled using the data packets logging the common events. For example, because of the data packets 540 and 544 (FIG. 5A) for the common event Async 0, a person debugging threads will know that the T1-P2 packet 530 was written for an event that occurred 2000 clock cycles before the data packet for the common event 540 was generated and that the T2-P1 packet 550 was generated for an event that occurred 1000 clock cycles after the data packet for the common event 544 was generated. Thus, by using the data packets for the common event 540 and 544, one can determine that the T2-P1 data packet 550 was generated 3000 clock cycles after T1-P2 530 was generated. According to the embodiments of FIGS. 5A-5C, the data packets representing events occurring in each of the threads can be reconciled regardless of when each of the clock cycle counters 512 and 552 were started.

Also, as shown in the illustrative embodiment of FIG. 4B, the T1 cycle counter 512 and the T2 clock cycle counter 552 each may be reset upon the occurrence of particular events. Resetting the clock cycle counters 512 and 552 may reduce the value stored in the packets and, thus, may reduce the sizes of the packets. The clock cycle counters 512 and 552 may be reset, for example, each time that a common event, such as common event 540, is logged. Thus, the T2-P1 packet 550 stores a clock cycle counter value accumulated since a last reset, as shown in the illustrative embodiment of FIG. 4B.

As previously described, there is a risk of packet loss when the FIFO buffer 240 (FIG. 2) overflows. Overflow of the FIFO buffer 240 may occur when too many packets are received simultaneously or when packets are written to the FIFO buffer 240 more quickly than the packets may be output via the trace port 260. Synchronizing the clock cycle counters between multiple threads may similarly lead to overflow of the FIFO buffer 240. For example, each of the threads may be associated with a plurality of counters, including an execution clock cycle counter, a non-execution clock cycle counter, etc. When the execution units are fully loaded, the execution clock cycle counters for multiple threads may approach their maximum capacity at about the same time. Alternatively, when the execution units are not busy, the non-execution clock cycle counters for multiple threads may near capacity at about the same time. If the clock cycle count capacity packets for these events are written to the FIFO buffer 240 at the same time as each reaches capacity, the simultaneous or nearly simultaneous writing of the clock cycle count capacity packets may result in an overflow.

According to a particular illustrative embodiment, different counters for each of the threads may be configured to generate packets, such as clock cycle count capacity packets, before the counters reach capacity. By setting a threshold to generate, for example, a clock cycle count capacity packet before the clock cycle count actually reaches capacity, there will be more time for the packets to be written to the FIFO buffer 240 in case the FIFO buffer 240 is in overflow when the packets arrive. By allowing more time for the packets to be written to the FIFO buffer 240, the chance of packets being lost may be reduced.

FIG. 6 shows a block diagram of a multi-threaded processing system 600 including, for the sake of illustration, two threads. Thread 0 610 is associated with a non-execution cycle counter 620 that counts a number of unused cycles for thread 0 610 since a last reset. Thread 1 630 is associated with a non-execution cycle counter 640 that counts a number of unused cycles for thread 1 630 since a last reset.

Like packets for other events, clock cycle capacity count packets are generated and written to a FIFO buffer (e.g., the FIFO buffer 240 of FIG. 2) when an event occurs. According to a particular illustrative embodiment, instead of packets being generated to report that the non-execution cycle counters 620 and 640 have reached their full capacity, a threshold 650 is set that causes the packets reporting the non-execution clock cycle counters 620 and 640 to be written before the non-execution clock cycle counters 620 and 640 fully reach capacity. In the example of FIG. 6, the threshold 650 is set at 99 percent of counter capacity. The FIFO buffer 240 may be in overflow when one or both of the non-execution clock cycle counters 620 and 640 reach 99 percent capacity and one or both of the non-execution clock cycle counters 620 and 640 is unable to write the clock cycle count capacity packet to the FIFO buffer 240 at that time. However, the threshold 650 provides a margin of time to retry writing the clock cycle count capacity packets to the FIFO buffer 240 before the counters 620 and 640 reach absolute capacity and are reset. The margin provided by the threshold 650 may thereby help prevent the loss of the packet data before the non-execution clock cycle counters 620 and 640 are reset.

FIG. 7 shows a block diagram of a multi-threaded processing system 700 including the same two threads 610 and 630 of FIG. 6 for which different thresholds 650 and 750 are used. To attempt to further reduce the risk of overflow of the FIFO buffer 240 that may result in packet loss, different clock cycle counters may be configured to write out clock cycle count capacity thresholds at different threshold points. For example, as shown in FIG. 7, the threshold 650 for the non-execution clock cycle counter 620 for thread 0 610 may be set at 99 percent of capacity for the non-execution clock cycle counter 620. At the same time, the threshold 750 for the non-execution clock cycle counter 640 for thread 1 630 may be set at 98 percent of capacity for the non-execution clock cycle counter 640. When the processing system 700 is not busy, if the thresholds 650 and 750 were the same there is an increased possibility that packets for both thread 0 610 and thread 1 630 are generated at the same time, creating a risk of contention at the FIFO buffer 240. By setting the thresholds 650 and 750 to different values relative to capacity, this risk may be reduced.

It should be noted that different threshold values also may be set for different clock cycle counters within each of the same threads. For example, for thread 0 610, an execution clock cycle counter (not shown) may have a threshold set at 97 percent or another value to potentially further distribute the generation of packets for a single thread to potentially further reduce the risk of contention for and possible overflow of the FIFO buffer 240.

FIG. 8 is a flow diagram of a particular illustrative embodiment of a method 800 of facilitating debugging by synchronizing clock cycle counters between different threads, as described with reference to FIGS. 4A and 4B. In an illustrative embodiment, the method 800 is performed by the embedded trace macro system 270 of FIG. 2 or another comparable system configured to gather data regarding execution of a plurality of software threads. Data is collected for events occurring for each of the plurality of software threads where the data for each of the events includes a value of an associated clock cycle counter where the data is collected upon occurrence of the event, at 802. For example, in an illustrative embodiment, the ETM unit 230 (FIG. 2) generates packets describing each of the events to be collected in a FIFO buffer (FIG. 2). A plurality of clock cycle counters associated with the plurality of software threads is started at a common time, at 804. For example, in an illustrative embodiment, the ETM system 170 (FIG. 1) may cause the clock cycle counters 160 (FIG. 1) to be reset at a common time. Packets including the data for the plurality of software threads are output, such as via a trace port 260 (FIG. 2).

FIG. 9 is a flow diagram of another particular illustrative embodiment of a method 900 of facilitating debugging by including a packet representing a synchronizing event in data for each of the different threads, as described with reference to FIGS. 5A-5C. Data is collected for events occurring at each of the plurality of software threads where the data for each of the events includes a value of the associated clock cycle counter where the data is collected upon occurrence of the event, at 902. An occurrence of a synchronizing event is logged within each of the plurality of software threads, at 904. For example, in an illustrative embodiment, the ETM system 270 (FIG. 2) may cause the occurrence of the synchronizing event to be logged within each of the plurality of software threads. Data for each of the plurality of software threads is output, where the data for each of the plurality of software threads includes the data for the synchronizing event, at 908. For example, in an illustrative embodiment, the packets may be output via a trace port 260 (FIG. 2).

FIG. 10 is a flow diagram of a particular illustrative embodiment of a method 1000 of using clock cycle count data that is synchronized in debugging software. Packets representing data for each of a plurality of software threads where each of the plurality of software threads is associated with one or more clock cycle counters where the clock cycle counters are synchronized between the various software threads, are received at 1002. For example, in an illustrative embodiment, the ETM unit 230 (FIG. 2) generates packets describing each of the events to be collected in a FIFO buffer (FIG. 2) where each of the plurality of software threads is associated with one of a plurality of clock cycle counters 160 (FIG. 1) that are synchronized between the various software threads by the ETM unit 230 or another apparatus. The timing of events represented by the packets of data between the plurality of software threads is reconciled by comparing the clock cycle counter value associated with each of the plurality of software threads, where clock cycle counter values included in the packets are reconcilable because the clock cycle counter associated with each of the two more software threads is started at a common time or the packets of data include a synchronizing event logged for each of the plurality of software threads, at 1004. For example, in an illustrative embodiment, a debug tool 180 (FIG. 1) may be used to reconcile the clock cycle counter value associated with each of the plurality of clock cycle counter values included in the packets.

FIG. 11 is a flow diagram of a particular illustrative embodiment of a method 1100 of reducing a risk of packet loss resulting from buffer overflow by using thresholds as described with reference to FIGS. 6 and 7. Data is collected for events occurring in each of a plurality of software threads, at 1102. For example, in an illustrative embodiment, data for the events occurring in each of the plurality of software threads is collected by an ETM unit 230 (FIG. 2). When the clock cycle count reaches a threshold value that is less than a full capacity vale of the clock cycle count is monitored, at 1104. For example, in an illustrative embodiment, the clock cycle count is monitored by an embedded trace macro system 270 (FIG. 2). The collected data is transmitted when the clock cycle counter reaches the predetermined threshold, at 1106. For example, in an illustrative embodiment, a point or time when the clock cycle counter reaches the predetermined threshold is monitored by the ETM system 170 (FIG. 1) or the ETM system 270 (FIG. 2).

FIG. 12 is a block diagram of a particular illustrative embodiment of a communications device that includes a digital signal processor (DSP) 1210 that includes an embedded trace macro unit 1264 configured to use synchronized clock cycle counters and to use thresholds to prevent buffer overflow resulting in potential loss of data packets, such as depicted in FIGS. 1-11. The embedded trace macro unit 1264 uses a first-in-first-out buffer 1266, as previously described with reference to FIG. 2 and an embedded trace buffer 1246 in a memory device 1232, where contents of the embedded trace buffer 1246 may be used to debug software problems, as previously described. FIG. 12 also shows a display controller 1226 that is coupled to the digital signal processor 1210 and to a display 1228. Moreover, an input device 1230 is coupled to the digital signal processor 1210. A coder/decoder (CODEC) 1234 can also be coupled to the digital signal processor 1210. A speaker 1236 and a microphone 1238 can be coupled to the CODEC 1234.

FIG. 12 also indicates that a wireless controller 1240 can be coupled to the digital signal processor 1210 and to a wireless antenna 1242. In a particular embodiment, a power supply 1244 is coupled to the on-chip system 1222. Moreover, in a particular embodiment, as illustrated in FIG. 12, the display 1228, the input device 1230, the speaker 1236, the microphone 1238, the wireless antenna 1242, the power supply 1244, and a video camera 1270 are external to the on-chip system 1222. However, each is coupled to a component of the on-chip system 1222.

It should be understood that while the embedded trace macro unit 1264 configured to use synchronized clock cycle counters and to use thresholds to use prevent buffer overflow resulting in potential loss of data packets is depicted as a separate component of the digital signal processor 1210, the embedded trace macro unit 1264 may be otherwise integrated into other components of the digital signal processor 1210, manifested as separate components in the digital signal processor 1210, or otherwise.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices such as the communications device described above with reference to FIG. 12 or in other devices. FIG. 13 depicts a particular illustrative embodiment of an electronic device manufacturing process 1300.

Physical device information 1302 is received in the manufacturing process 1300, such as at a research computer 1306. The physical device information 1302 may include design information representing at least one physical property of a semiconductor device, such as a processor or other semiconductor device including an embedded trace macro (ETM) unit employing clock cycle count synchronization and to use thresholds to prevent buffer overflow resulting in potential loss of data packets as described with reference to FIGS. 1-11. For example the physical device information 1302 may include physical parameters, material characteristics, and structure information that is entered via a user interface 1304 coupled to the research computer 1306. The research computer 1306 includes a processor 1308, such as one or more processing cores, coupled to a computer readable medium such as a memory 1310. The memory 1310 may store computer readable instructions that are executable to cause the processor 1308 to transform the physical device information 1302 to comply with a file format and to generate a library file 1312.

In a particular embodiment, the library file 1312 includes at least one data file including the transformed design information. For example, the library file 1312 may include a library of semiconductor devices including the ETM unit employing clock cycle count synchronization and thresholds to prevent buffer overflow resulting in potential loss of data packets (shortened to "ETM unit" in FIG. 13) of FIGS. 1-11 that is provided for use with an electronic design automation (EDA) tool 1320.

The library file 1312 may be used in conjunction with the EDA tool 1320 at a design computer 1314 including a processor 1316, such as one or more processing cores, coupled to a memory 1318. The EDA tool 1320 may be stored as processor executable instructions at the memory 1318 to enable a user of the design computer 1314 to design a circuit using an ETM unit as described with reference to FIGS. 1-11. For example, a user of the design computer 1314 may enter circuit design information 1322 via a user interface 1324 coupled to the design computer 1314. The circuit design information 1322 may include design information representing at least one physical property of a semiconductor device, such as a processor or other semiconductor device using an ETM unit as described with reference to FIGS. 1-11. To illustrate, the circuit design property may include identification of particular circuits and relationships to other elements in a circuit design, positioning information, feature size information, interconnection information, or other information representing a physical property of a semiconductor device.

The design computer 1314 may be configured to transform the design information, including the circuit design information 1322 to comply with a file format. To illustrate, the file formation may include a database binary file format representing planar geometric shapes, text labels, and other information about a circuit layout in a hierarchical format, such as a Graphic Data System (GDSII) file format. The design computer 1314 may be configured to generate a data file including the transformed design information, such as a GDSII file 1326 that includes information describing the ETM unit as described with reference to FIGS. 1-11, in addition to other circuits or information. To illustrate, the data file may include information corresponding to a system-on-chip (SOC) using an ETM unit as described with reference to FIGS. 1-11 and that also includes additional electronic circuits and components within the SOC.

The GDSII file 1326 may be received at a fabrication process 1328 to manufacture a device using an ETM unit as described with reference to FIGS. 1-11 according to transformed information in the GDSII file 1326. For example, a device manufacture process may include providing the GDSII file 1326 to a mask manufacturer 1330 to create one or more masks, such as masks to be used for photolithography processing, illustrated as a representative mask 1332. The mask 1332 may be used during the fabrication process to generate one or more wafers 1334, which may be tested and separated into dies, such as a representative die 1336. The die 1336 includes a circuit including such as using an ETM unit as described with reference to FIGS. 1-11.

The die 1336 may be provided to a packaging process 1338 where the die 1336 is incorporated into a representative package 1340. For example, the package 1340 may include the single die 1336 or multiple dies, such as a system-in-package (SiP) arrangement. The package 1340 may be configured to conform to one or more standards or specifications, such as Joint Electron Device Engineering Council (JEDEC) standards.

Information regarding the package 1340 may be distributed to various product designers, such as via a component library stored at a computer 1346. The computer 1346 may include a processor 1348, such as one or more processing cores, coupled to a memory 1310. A printed circuit board (PCB) tool may be stored as processor executable instructions at the memory 1310 to process PCB design information 1342 received from a user of the computer 1346 via a user interface 1344. The PCB design information 1342 may include physical positioning information of a packaged semiconductor device on a circuit board, the packaged semiconductor device corresponding to the package 1340 including a processor or other semiconductor device using an ETM unit as described with reference to FIGS. 1-11.

The computer 1346 may be configured to transform the PCB design information 1342 to generate a data file, such as a GERBER file 1352. The GERBER file 1352 or other data file may include data that includes physical positioning information of a packaged semiconductor device on a circuit board. The GERBER file 1352 or other data file may also include information describing layout of electrical connections such as traces and vias, where the packaged semiconductor device includes a processor or other semiconductor device using an ETM unit as described with reference to FIGS. 1-11. In other embodiments, the data file generated by the transformed PCB design information may have a format other than a GERBER format.

The GERBER file 1352 may be received at a board assembly process 1354 and used to create PCBs, such as a representative PCB 1356, manufactured in accordance with the design information stored within the GERBER file 1352. For example, the GERBER file 1352 may be uploaded to one or more machines for performing various steps of a PCB production process. The PCB 1356 may be populated with electronic components including the package 1340 to form a represented printed circuit assembly (PCA) 1358.

The PCA 13108 may be received at a product manufacture process 1360 and integrated into one or more electronic devices, such as a first representative electronic device 1362 and a second representative electronic device 1364. As an illustrative, non-limiting example, the first representative electronic device 1362, the second representative electronic device 1364, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 1362 and 1364 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Notwithstanding, the disclosure is not limited to these exemplary illustrated units.

Thus, a processor or other semiconductor device using an ETM unit as described with reference to FIGS. 1-11 may be fabricated, processed, and incorporated into an electronic device, as described in the illustrative process 1300. One or more aspects of the embodiments disclosed with respect to FIGS. 1-11 may be included at various processing stages, such as within the library file 1312, the GDSII file 1326, and the GERBER file 13102, as well as stored at the memory 1310 of the research computer 1306, the memory 1318 of the design computer 1314, the memory 1350 of the computer 1346, the memory of one or more other computers or processors (not shown) used at the various stages, such as at the board assembly process 1354, and also incorporated into one or more other physical embodiments such as the mask 1332, the die 1336, the package 1340, the PCA 1358, other products such as prototype circuits or devices (not shown), or any combination thereof. Although various representative stages of production from a physical device design to a final product are depicted, in other embodiments fewer stages may be used or additional stages may be included. Similarly, the process 1300 may be performed by a single entity, or by one or more entities performing various stages of the process 1300.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    collecting data for a plurality of events, each of the plurality events associated with at least one of a plurality of software threads being processed by a processor, wherein the data for each of the plurality of events includes a value of an associated clock cycle counter and wherein the data is collected upon occurrence of the event and stored at a first-in-first-out (FIFO) buffer, wherein the data is correlated by one of:
        starting each of a plurality of clock cycle counters associated with the plurality of software threads at a common time; and
        logging a synchronizing event within each of the plurality of software threads upon occurrence of the synchronizing event, wherein the synchronizing event includes an execution start of one of the plurality of software threads;
    outputting the data from a trace port of the FIFO buffer to a debugging device in response to a count indicated by at least one clock cycle counter of the plurality of clock cycle counters reaching a count threshold that is less than a count capacity associated with the at least one clock cycle counter; and
    resetting each of the plurality of clock cycle counters in response to outputting the data.

2. The method of claim 1, wherein the common time is a reset time of the plurality of clock cycle counters.

3. The method of claim 1, wherein the common time is an execution start time of one of the plurality of software threads.

4. The method of claim 1, wherein the common time is a time when an embedded trace macro packet is committed in one of the plurality of software threads.

5. The method of claim 1, wherein the clock cycle counter for a first software thread of the plurality of software threads is started at a time when the first software thread is not active.

6. The method of claim 1, wherein collecting the data is performed by an embedded trace macro, and wherein the embedded trace macro is configured to permit user selection of the data to be logged.

7. An apparatus comprising an integrated circuit, the integrated circuit comprising:
a plurality of clock cycle counters configured to be started at a common time, wherein each of the plurality of clock cycle counters is associated with a respective one of a plurality of software threads, and wherein a first clock cycle counter of the plurality of clock cycle counters is configured to output a count indicated by the first clock cycle counter in response to the count reaching a count threshold that is less than a count capacity associated with the first clock cycle counter;
a first-in-first-out (FIFO) buffer configured to collect and store packet data for events occurring during each of the plurality of software threads, wherein the packet data for each of the events is associated with a value of the associated clock cycle counter; and
a trace port configured to output the packet data collected in the FIFO buffer,
wherein each of the plurality of clock cycle counters is configured to resettable in response to outputting the packet data.

8. The apparatus of claim 7, further comprising a processing system configured to execute the plurality of software threads.

9. The apparatus of claim 8, wherein the processing system comprises a multi-threaded processor, wherein at least two of a plurality of hardware threads of the multi-threaded processor are configured to process one or more of the plurality of software threads.

10. The apparatus of claim 8, wherein the processing system comprises a multi-core processor wherein at least two of a plurality of processing cores are configured to process one or more of the plurality of software threads.

11. The apparatus of claim 7, further comprising a device, selected from the group consisting of a set top box, a music player, a video player, an entertainment unit, a navigation device, a communications device, a personal digital assistant (PDA), a fixed location data unit, and a computer, into which the at least one semiconductor device is integrated.

12. An apparatus comprising an integrated circuit, the integrated circuit comprising:
a processing system configured to execute a plurality of software threads;
a plurality of clock cycle counters, wherein each of the plurality of clock cycle counters is associated with a respective one of the plurality of software threads;
circuitry configured to log, as packet data, an occurrence of a synchronizing event associated with each of the plurality of software threads, wherein logging the occurrence of the synchronizing event includes determining a first clock cycle count of the clock cycle counter that is associated with a first thread of the plurality of software threads and further includes determining a second clock cycle count of the clock cycle counter that is associated with a second thread of the plurality of software threads, and wherein the first clock cycle count and the second clock cycle count are determined in response to the occurrence of the synchronizing event;
a first-in-first-out (FIFO) buffer configured to collect and store packet data for events occurring during execution of each of the plurality of software threads, wherein the packet data for each of the events is associated with a value of the associated clock cycle counter; and
a trace port configured to output the packet data collected in the FIFO buffer in response to a count indicated by at least one clock cycle counter of the plurality of clock cycle counters reaching a count threshold that is less than a count capacity associated with the at least one clock cycle counter,
wherein each of the plurality of clock cycle counters is configured to be resettable in response to outputting the packet data.

13. The apparatus of claim 12, wherein the processing system comprises a multi-threaded processor, wherein each of a plurality of hardware threads of the multi-threaded processor is configured to process one of the plurality of software threads.

14. The apparatus of claim 12, wherein the processing system comprises a multi-core processor wherein each of a plurality of processing cores is configured to process one of the plurality of software threads.

15. The apparatus of claim 12, wherein the FIFO buffer is configured to output the collected packet data for one or more of the plurality of software threads via the trace port before the associated clock cycle counter for each of the plurality of software threads reaches a counter threshold that is less than a maximum count of the associated clock cycle counter.

16. The apparatus of claim 12, further comprising a device, selected from the group consisting of a set top box, a music player, a video player, an entertainment unit, a navigation device, a communications device, a personal digital assistant (PDA), a fixed location data unit, and a computer, into which the at least one semiconductor die is integrated.

17. A non-transitory computer-readable storage medium storing instructions executable by a computer system to:
start each of a plurality of clock cycle counters associated with each of a plurality of software threads;
collect and store packet data in a first-in-first-out (FIFO) buffer for a plurality of events, each of the plurality of events associated with at least one of the plurality of software threads wherein the packet data for each of the events is associated with a value of the associated clock cycle counter;
correlate the packet data for each of the plurality of software threads by one of:
starting each of the plurality of clock cycle counters at a common time; and
logging a synchronizing event within each of the plurality of software threads upon occurrence of the synchronizing event, wherein the synchronizing event includes an execution start of one of the plurality of software threads;
determine that a count indicated by at least one of the plurality of clock cycle counters has reached a count threshold that is less than a count capacity associated with the at least one of the plurality of clock cycle counters;
output the packet data from a trace port of the FIFO buffer for the plurality of software threads in response to determining that the count has reached the count threshold; and
reset each of the plurality of clock cycle counters in response to outputting the packet data.

18. The non-transitory computer-readable storage medium of claim 17, further comprising instructions to permit user selection of the packet data to be logged.

19. An apparatus comprising an integrated circuit, the integrated circuit comprising:
   means for collecting packet data for a plurality of events, each of the plurality of events associated with at least one of a plurality of software threads and for associating the packet data with a clock cycle count;
   means for monitoring when a clock cycle counter reaches a threshold that is less than a maximum counter value;
   means for correlating the packet data for each of the plurality of software threads,
      wherein the means for correlating the packet data is one of:
      means for maintaining the clock cycle count for each of the plurality of software threads that is started at a common time; and
      means for collecting packet data for the plurality of events associated with at least one of the plurality of software threads and for logging a synchronizing event within each of the plurality of software threads upon occurrence of the synchronizing event and stored in a first-in-first-out (FIFO) buffer, wherein the synchronizing event includes an execution start of one of the plurality of software threads;
   means for transmitting the packet data via a trace port of the FIFO buffer when the clock cycle counter reaches the threshold; and
   means for resetting each of the plurality of clock cycle counters in response to transmitting the packet data.

20. A method comprising:
   receiving design information representing at least one physical property of a semiconductor device, the semiconductor device including:
      a processor configured to execute a plurality of software threads;
      a plurality of clock cycle counters, wherein each of the plurality of clock cycle counters is associated with one of the plurality of software threads, and wherein a first clock cycle counter of the plurality of clock cycle counters is configured to output a count indicated by the first clock cycle counter in response to the count reaching a count threshold that is less than a count capacity associated with the first clock cycle counter;
      a first-in-first-out (FIFO) buffer configured to collect and store packet data for each of the plurality of software threads, wherein the packet data for each of a plurality of events of each of the plurality of software threads is associated with a value of the associated clock cycle counter and wherein the packet data for each of the plurality of software threads is correlated by one of:
         starting each of the plurality of clock cycle counters at a common time; and
         logging a synchronizing event within each of the plurality of software threads upon occurrence of the synchronizing event, wherein the synchronizing event includes an execution start of one of the plurality of software threads; and
      a trace port configured to output the packet data collected in the buffer;
      wherein each of the plurality of clock cycle counters is configured to be resettable in response to outputting the packet data;
   transforming the design information to comply with a file format; and
   generating a data file including the transformed design information.

21. The method of claim 20, wherein the data file is included in a library of semiconductor devices.

22. The method of claim 21, further comprising providing the library of semiconductor devices for use with an electronic design automation tool.

23. The method of claim 20, wherein the file format includes a GDSII format.

24. The method of claim 20, further comprising:
   manufacturing the semiconductor device according to the transformed design information from the data file.

25. A method comprising:
   receiving and storing packet data for each of two or more software threads in a first-in-first-out (FIFO) buffer, wherein the packet data for each of the two or more software threads is associated with a non-execution clock cycle counter value generated by a non-execution clock cycle counter, and wherein the packet data includes a first non-execution clock cycle counter value that is generated by a first non-execution clock cycle counter in response to the first non-execution clock cycle counter reaching a first threshold that is less than a first count capacity associated with the first non-execution clock cycle counter; and
   reconciling timing of the packet data for the two or more software threads by comparing the non-execution clock cycle counter value associated with each of the two or more software threads, wherein the non-execution clock cycle counter values are reconcilable based on one of:
      the non-execution clock cycle counter associated with each of the two or more software threads is started at a common time; and
      the packet data includes data for a synchronizing event logged for each of the two or more software threads, wherein the synchronizing event includes an execution start of one of the two or more software threads;
   wherein the first non-execution clock cycle counter is configured to be resettable in response to outputting the packet data from a trace port of the FIFO buffer.

26. The method of claim 1, wherein logging the synchronizing event includes determining a first clock cycle count of the clock cycle counter that is associated with a first thread of the plurality of software threads and further includes determining a second clock cycle count of the clock cycle counter that is associated with a second thread of the plurality of software threads.

27. The method of claim 26, wherein logging the synchronizing event further comprises:
   detecting the synchronizing event; and
   in response to detecting the synchronizing event, generating a first packet corresponding to the first thread of the plurality of software threads and further generating a second packet corresponding to the second thread of the plurality of software threads,
   wherein the first packet indicates the first clock cycle count, and wherein the second packet indicates the second clock cycle count, and
   wherein outputting the data to the debugger includes outputting the packets to the debugger.

28. The method of claim 27, further comprising determining a difference between the first clock cycle count and the second clock cycle count.

29. The method of claim 25, wherein the packet data further includes a second non-execution clock cycle counter value that is generated by a second non-execution clock cycle counter in response to the second non-execution clock cycle counter reaching a second threshold that is less than a second count capacity associated with the second non-execution clock cycle counter, and wherein the first threshold is different than the second threshold.

30. The method of claim 1, wherein the debugging device is external to the processor.

31. The method of claim 1, further comprising debugging the plurality of software threads executing on a plurality of hardware threads using the data output.

* * * * *